(12) United States Patent
Militello et al.

(10) Patent No.: US 9,392,213 B1
(45) Date of Patent: Jul. 12, 2016

(54) RECURSIVE MOTION VIDEO DE-INTERLACING DEVICE

(71) Applicant: STMicroelectronics Asia Pacific Pte Ltd, Singapore (SG)

(72) Inventors: Guillaume Militello, Singapore (SG); Lucas Hui, ISuites @ Tani (SG)

(73) Assignee: STMICROELECTRONICS ASIA PACIFIC PTE LTD, Singapore (SG)

( * ) Notice: Subject to any disclaimer, the term of this patent is extended or adjusted under 35 U.S.C. 154(b) by 0 days.

(21) Appl. No.: 14/814,231

(22) Filed: Jul. 30, 2015

(51) Int. Cl.
*H04N 7/01* (2006.01)

(52) U.S. Cl.
CPC .................................. *H04N 7/012* (2013.01)

(58) Field of Classification Search
CPC ..... H04N 7/012; H04N 7/014; H04N 7/0137; H04N 7/0135
USPC .................. 348/448, 451, 452, 441
IPC .......................................................... H04N 7/01
See application file for complete search history.

(56) References Cited

U.S. PATENT DOCUMENTS

| | | | |
|---|---|---|---|
| 4,546,386 A | 10/1985 | Matsumoto et al. | |
| 7,193,655 B2 | 3/2007 | Nicolas | |
| 7,990,471 B1 * | 8/2011 | Otobe | H04N 7/0115 348/448 |
| 8,774,278 B2 | 7/2014 | Tang et al. | |
| 2005/0078214 A1 | 4/2005 | Wong et al. | |
| 2006/0152620 A1 | 7/2006 | Morita | |

FOREIGN PATENT DOCUMENTS

EP 0 683 614 B1 5/1999

OTHER PUBLICATIONS

Chang et al., "Adaptive Arbitration of Intra-Field and Motion Compensation Methods for De-interlacing," *IEEE Transactions on Circuits and Systems for Video Technology* 19(8): 1214-1220, Aug. 2009.
Lee et al., "Spatio-Temporal De-interlacing Based on Maximum Likelihood Estimation," 2011 IEEE Visual Communications and Image Processing, Nov. 6-9, 2011, Tainan, pp. 1-4.

* cited by examiner

*Primary Examiner* — Sherrie Hsia
(74) *Attorney, Agent, or Firm* — Seed IP Law Group PLLC

(57) ABSTRACT

A video de-interlacing device includes a video data input interface to receive a stream of interlaced video data, a motion detector coupled to the video data input interface to produce motion detection video data, and a video data output interface to pass de-interlaced video data generated from the motion detection video data. The video de-interlacing device also includes a recursive motion processor to detect a still motion condition in at least one area of the motion detection video data. The recursive motion processor includes a local still detector, a large area motion detector, and a feathering detector. The recursive motion processor is arranged to produce motion information used to crop the motion detection video data based on the detected still motion condition.

20 Claims, 21 Drawing Sheets

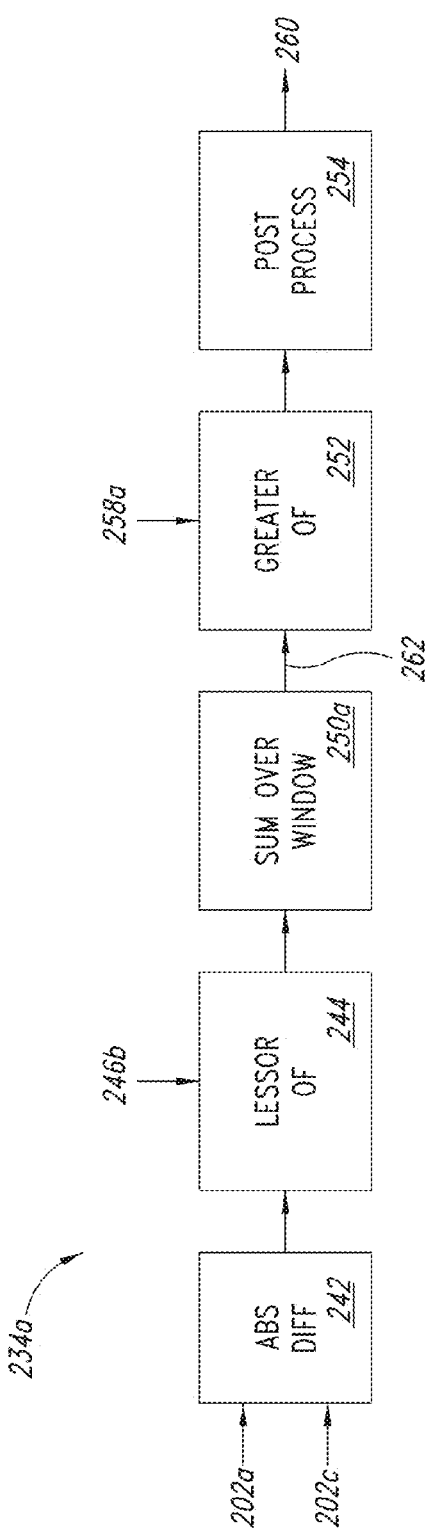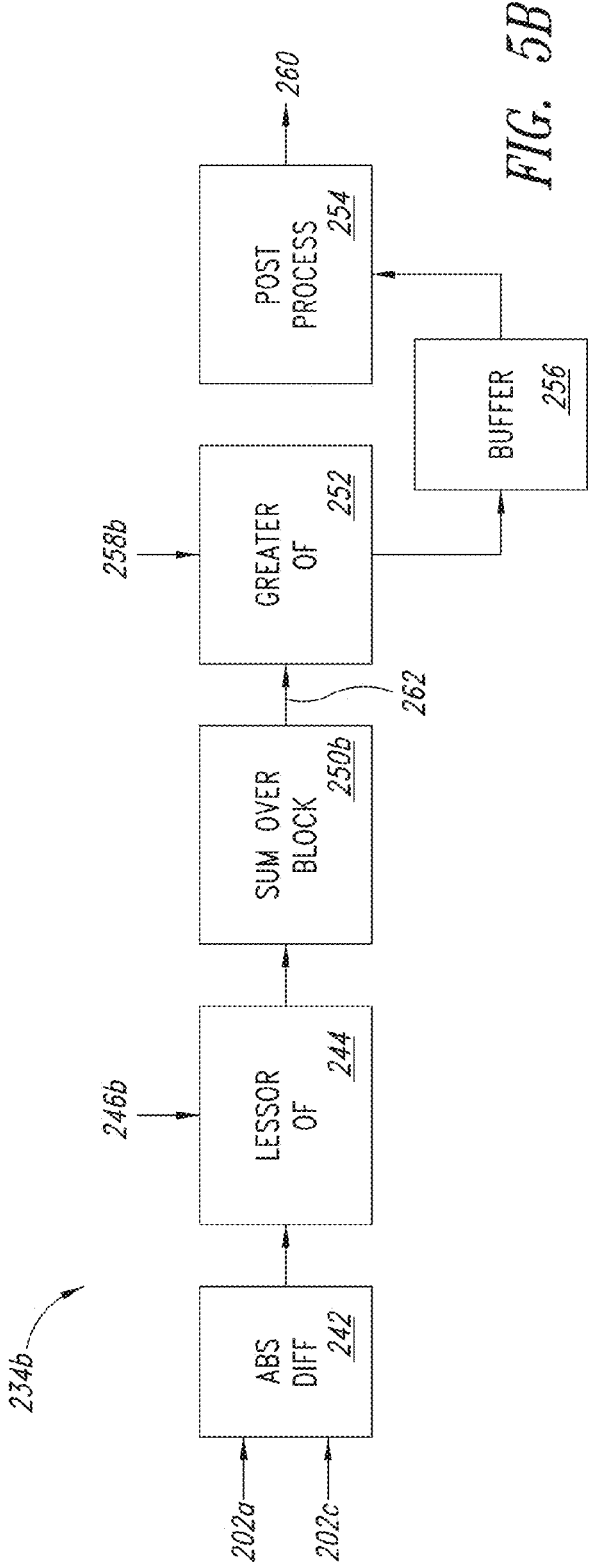

RECURSIVE MOTION VIDEO DE-INTERLACING DEVICE

BACKGROUND

1. Technical Field

The present disclosure generally relates to acts and devices to convert interlaced video into a de-interlaced form. More particularly, but not exclusively, the present disclosure relates to electronic devices that employ techniques to detect a still motion condition and improve the quality of de-interlaced video.

2. Description of the Related Art

In a conventional interlaced video image, each full frame of displayable video information includes two fields or sub-frames. One field is designated "odd," and the other field is designated "even." Each field is constituted with video data representing horizontal lines of displayable video information. The odd fields include the video information for odd horizontal lines of a display (i.e., 1, 3, 5, . . . ), and the even fields include the video information for even horizontal lines of the display (i.e., 2, 4, 6, . . . ). When the conventional video image is formed, the horizontal odd lines of video information are composed, one-by-one, and then the alternate even lines of video information are composed, one-by-one, into the spaces between the odd lines.

In traditional display systems, such as in the cathode-ray tubes (CRTs) found in television sets and early computer monitors, the video information was rendered with an electron gun that scanned the inside face of the CRT on alternate lines beginning in an upper left corner and finishing in a lower right corner. First, odd lines would be rendered, and then even lines would be rendered. These conventional systems are known as interlaced scanning systems. Interlaced scanning systems can provide an effective doubling of the frame rate, which reduces the effects of flicker. Alternatively, interlaced scanning systems can also provide the effect of doubling vertical resolution of an image without an increased requirement for additional bandwidth.

In current display systems, such as those formed as plasma panels, light-emitting diode (LED) panels, and the like, video images are formed as a matrix with individually addressable pixels. In these systems, each individual frame of data is drawn, stored, or communicated in sequence. These systems are known as non-interlaced or progressive scanning systems, and each individual frame may be prepared in a frame buffer having defined rows and columns.

A frame buffer forms a complete video image, which can be rendered as a whole on the display. In sequentially displayed frames, some portions of the display are maintained intact while other portions of the display are updated with new information. For example, when displaying a motion picture of sequential video frames that show an outdoor scene, portions of a background will not change from one frame to the next, but an object moving in the scene may require foreground portions to change from one frame to the next.

Since conventional video sources that communicate interlaced video streams still abound, systems are needed to convert the interlaced video signals to de-interlaced video signals. In some systems, an odd and an even frame are combined into a single output frame for display. In other systems, each odd frame and each even frame is converted using interpolation techniques, for example to create a single output frame.

Both types of conversion, as well as others, cause problems in the output display. One reason for the problems is that each subsequent field of video data represents a portion of a recorded scene from a different time. This is very noticeable when an object in a scene is in motion or when a camera capturing a scene is in motion (e.g., "panning" across a scene). When capturing a video of a person riding a bicycle, for example, the person and the bike are moving in real time, and each subsequent captured image will place the person and the bike at a different location in the frame. As another example, when moving the camera to pan a scene that includes a non-moving object such a fence, the vertical rails of the fence will appear at slightly different locations in successive frames of the captured video. These differences caused by actual or perceived motion of captured video images are first processed by motion detection logic of the system that processes video for display. Subsequently, motion detection signals produced by the motion detection logic are processed by motion compensation algorithms, which are not discussed in the present disclosure.

FIG. 1 is a conventional video system 10 that receives interlaced video data, processes the video data, and displays a de-interlaced video output. The video data may be received wirelessly or over a wired medium (e.g., satellite, cable, electronically read memory, and the like), and the video data may be delivered in nearly any acceptable format. A sequence of odd and even interlaced video fields 12 is communicated to a receiving device 14 (e.g., a set top box). The receiving device 14 includes a wired or wireless front-end 16 to receive the interlaced video 12. The wired or wireless front-end 16 processes the fields and passes some or all of the video data to a motion processing device 22. As subsequent frames of the interlaced video 12 are received and processed, first delay buffer logic 18 and second delay buffer logic 20 capture and store time-separated frames of data.

In one system, the first delay buffer logic 18 stores frames that are one time unit separated from the current video frames of data, and the second delay buffer logic 20 stores frames that are two time units separated from the current video frames of data. In such a system, the current video data may be recognized at time T, the first delay buffer logic 18 video data is recognized as time T−1, and the second delay buffer logic 20 video data is recognized as time T−2.

The motion processing device 22 includes motion detection logic, spatial interpolation logic, and temporal interpolation logic. The motion detection logic looks at individual pixels of video data and determines (i.e., detects) whether pixels in one frame represent motion of an object or scene when compared to a corresponding pixel in a nearby frame. Based on the recognition of some type of motion, the spatial interpolation logic will compensate for spatial motion by applying a particular weighting factor, and the temporal interpolation logic will compensate for time-based motion by applying a different particular weighting factor.

The application of the weighting factors is performed by a mixing circuit 24 which may also be known as a "fader." The mixing circuit receives information and video data from the motion processing device 22 and produces the de-interlaced output video signal 26.

The de-interlaced output video signal 26 is stored in a frame buffer circuit 28. In the implementation of FIG. 1, the conventional video system 10 employs a conversion technique that combines data from odd and even fields into a single output frame. Alternative video systems may form an individual output frame from each individual odd field and from each individual even field. The representative data from odd and even frames is illustrated in the frame buffer circuit 28 for understanding of the illustration.

The data from the frame buffer circuit 28 is passed as displayable output video 30 to a display device 32.

Various de-interlacing systems have been researched for many years, and some known conventional systems now employ complex processing algorithms.

One such system is described in U.S. Pat. No. 7,193,655, which teaches a process and device for de-interlacing by pixel analysis. The patent describes many implementations including at least one method for de-interlacing a video signal wherein the output is provided either by a temporal interpolation or by a spatial interpolation or a mixture of both. In such a method, the decision for the interpolation is based on motion detection in the relevant area of a window.

Another known system is described in U.S. Pat. No. 8,774,278, which teaches recursive motion for a motion detection de-interlacer device. The patent describes a method for detecting motion in an interlaced video signal using a recursive motion result from a previous instance. A final motion value is used to generate blend factors corresponding to the missing pixels.

An image apparatus and image processing method is described in U.S. Patent Publication No. 2006/0152620A1. The method teaches detecting an image portion that is intended to be a "still image" based on motion detection results. A history value is generated and used to determinate a mixture ratio between an in-field interpolation and an inter-field interpolation.

Yet one more system is described in U.S. Patent Publication No. 2005/0078214A1, which teaches a method and de-interlacing apparatus that employs recursively generated motion history maps. In the patent, a de-interlacer includes recursive motion history map generating circuitry operative to determine a motion value associated with one or more pixels in interlaced fields based on pixel intensity information from at least two neighboring same polarity fields. The recursive motion history map generating circuitry generates a motion history map containing recursively generated motion history values for use in de-interlacing interlaced fields wherein the recursively generated motion history values are based, at least in part, on a decay function.

All of the subject matter discussed in the Background section is not necessarily prior art and should not be assumed to be prior art merely as a result of its discussion in the Background section. Along these lines, any recognition of problems in the prior art discussed in Background section or associated with such subject matter should not be treated as prior art unless expressly stated to be prior art. Instead, the discussion of any subject matter in the Background section should be treated as part of the inventor's approach to the particular problem, which in and of itself may also be inventive.

BRIEF SUMMARY

The inventors have recognized that current de-interlacing technology has shortcomings caused by motion estimation and motion detection devices that improperly generate video frames. The improper video frames include "feathering" artifacts, "tail motion" or "halo" artifacts, and other motion-caused issues. The inventors devised solutions for these problems, wherein certain implementations of these solutions are summarized below. Further discussion of the solutions and implementations thereof is provided in other portions of the present disclosure such as in the Detailed Description.

A video de-interlacing device to reduce motion-caused artifacts may be summarized as including: a video data input interface to receive input video data, the input video data being a stream of interlaced video data, the input video data arranged in the video data input interface to include current video data, first delayed video data, and second delayed video data; a motion detector coupled to the video data input interface to produce motion detection video data from the input video data; a video data output interface coupled to the motion detector to pass de-interlaced video data, the de-interlaced video data generated from the motion detection video data; and a recursive motion processor coupled to the motion detector and arranged to detect a still motion condition, the recursive motion processor including: a first interface to pass the input video data; a second interface to pass previous motion data from a memory and to pass current motion data to the memory; and a third interface to pass a detected motion signal from the motion detector and to pass a processed motion signal to the motion detector, wherein the processed motion signal is based on the detected still motion condition, and wherein the motion detector is arranged to crop the motion detection video data based on the processed motion signal.

The motion-caused artifacts may include feathering artifacts. The motion-caused artifacts may include halo artifacts. The current motion data may include compressed motion data. The video de-interlacing device may include: a first field delay circuit to produce the first delayed video data; and a second field delay circuit to produce the second delayed video data. The video de-interlacing device may include: an intra-field spatial interpolation circuit coupled to the video data input interface to generate between-line pixels from video data sharing a common time parameter with pixels in an adjacent line; an inter-field temporal interpolation circuit coupled to the video data input interface to generate between-line pixels from video data sharing a common spatial parameter with pixels in an adjacent line; and a mixing circuit, the mixing circuit coupled to receive the motion detection video data from the motion detector, spatially interpolated video data from the intra-field spatial interpolation circuit, and temporally interpolated video data from the inter-field temporal interpolation circuit, the mixing circuit arranged to generate the de-interlaced video data. The video de-interlacing device may include: a method decision circuit coupled to the motion detector, the intra-field spatial interpolation circuit, and the inter-field temporal interpolation circuit, the method decision circuit arranged to direct the mixing circuit to generate the de-interlaced video data based on motion detection information and a selection or combination of spatial interpolation information and temporal interpolation information. The recursive motion processor may include: a local still detector coupled to the video data input interface; a large area motion detector coupled to the video data input interface; a feathering detector coupled to the video data input interface; and a motion decision circuit coupled to the local still detector, the large area motion detector, and the feathering detector, the motion decision circuit arranged to produce the processed motion signal, the processed motion signal selected from the previous motion data and zero motion data. The recursive motion processor may include: a local still detector arranged to produce a still-flag based on a difference between at least some of the current video data and at least some of the first delayed video data or second delayed video data, the still-flag arranged to indicate whether a portion of video associated with the at least some of the current video data is in motion. The recursive motion processor may include: a large area motion detector arranged to produce information identifying whether or not motion is detected within an area of interest, the area of interest covering at least one defined block of pixels.

A method to de-interlace an interlaced video stream may be summarized as including: receiving interlaced video data, detecting motion in the interlaced video data, producing motion detection video data based on the motion detected in the interlaced video data, detecting a still motion condition in at least one area of the motion detection video data, and producing de-interlaced video data based on the motion detection video data, the de-interlaced video data including a portion of video data that is cropped based on the detected still motion condition.

The portion of video data that is cropped is based on how much still motion is detected in the at least one area of motion detection video data. Detecting the still motion condition may include: performing local still detection; performing large area motion detection; and performing feathering detection. Performing large area motion detection may include detecting motion in at least one defined block of pixels.

A device may be summarized as including: an input circuit to receive and buffer interlaced video data; a circuit to perform motion detection on the interlaced video data, the circuit arranged to produce motion detection video data; and a recursive motion processor to detect a still motion condition in at least one area in the motion detection video data, the recursive motion processor to also generate information to crop a portion of the motion detection video data associated with the detected still motion condition.

The device may be an integrated circuit. The integrated circuit may include a system on chip (SoC). The recursive motion processor may include: a local still detector; a large area motion detector; and a feathering detector. The local still detector may include: an absolute difference module; and a comparator module. The feathering detector may include: an inter-field difference module; a math circuit; and a comparator module.

BRIEF DESCRIPTION OF THE SEVERAL VIEWS OF THE DRAWINGS

Non-limiting and non-exhaustive implementations are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more implementations are described hereinafter with reference to the accompanying drawings in which:

FIGS. 5A-5D are optional implementations of large area motion detectors;

FIG. 17A shows feathering artifacts in a conventional de-interlaced image in motion;

FIG. 17B shows the feathering artifacts in the conventional de-interlaced image in more detail;

FIG. 17C shows a reduction in feathering artifacts in an inventive de-interlaced image in motion;

DETAILED DESCRIPTION

Figure 1:
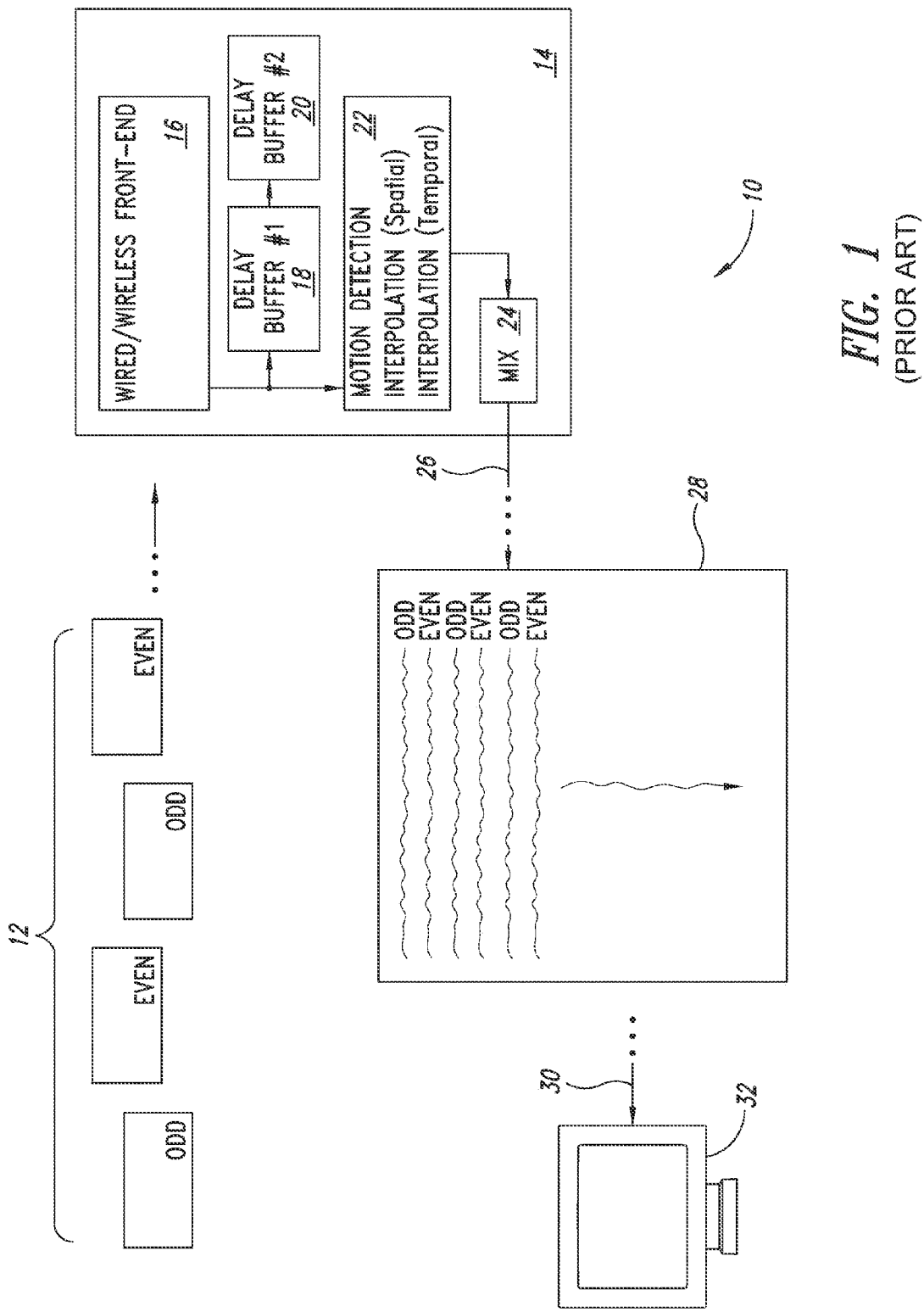
FIG. 1 is a conventional system that receives interlaced video data, processes the video data, and displays a de-interlaced video output.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with multimedia processing systems including processors, memories, and other computing device circuits and logic have not been shown or described in detail to avoid unnecessarily obscuring descriptions of the implementations.

Implementations of the recursive motion video de-interlacing devices and methods described herein may be defined in the digital video processing architectures and display pipes of receiving devices such as set-top boxes, digital video recorders, mobile devices, video processing integrated circuits, digital television (DTV) systems on-chip (SoCs), and other like structures.

As described herein, various de-interlacing systems have been researched for many years, and some known conventional systems now employ complex processing algorithms. It has been recognized by the inventors, however, that the known systems fail to solve many of the problems that arise in the conventional systems. In particular, the inventors have recognized that some problems remain with "feathering" artifacts in de-interlaced fast moving content that appears in repetitive patterns, and other problems remain with tail motion "halo" artifacts around moving objects on high frequency backgrounds. Still other problems remain with the long stabilization times necessary to settle high frequency content during scene changes. What's more, the conventional systems also suffer a high cost of maintaining, storing, and reloading motion history data. Accordingly, in view of the as-yet unsolved problems, implementations of the present invention seek to provide picture quality improvement by reducing or removing the effects of certain artifacts during de-interlacing. Exemplary implementations of the improved systems may be targeted toward high picture quality of standard definition (SD) or high definition (HD) video such as 1080i format de-interlacing.

Shortcomings of the conventional de-interlacing systems are addressed with implementations that provide adaptive control of up to three types of motion detection. A first type of motion detection is local still detection, which is implemented to detect one or more portions of an image that are in motion and remaining portions that are still. More particularly, "still motion" or a "still motion condition" represents a determination in an area of video data where no motion is detected or where only a small, tolerable amount of motion is detected. The small, tolerable amount of motion may accurately depict real motion that is either indiscernible or is barely discernable in the presentation of the video data. Alternatively, the small, tolerable amount of detected motion may be caused by noise captured when the video data is sensed and stored. In many cases, the still motion condition is detected as an absolute difference between corresponding areas of video data in consecutive frames or between corresponding areas of video data in nearly adjacent frames.

A second type of motion detection detects repeating patterns or "recursive motion" based on large area motion detection (LAMD), and a third type is feathering pattern detection. Implementations provide large area motion and feathering pattern detections to affirm whether or not the portions previously detected by the local still detection feature are really motion or the portions are still.

Various video data processing decisions may be made based on the three types of motion detection (i.e., local still, recursive, and feathering pattern detection). Considering a decision based on the three types of motion detection, for example, the motion detection is applied to create a reasonably accurate motion map, also called a "still map," of the image. The motion map defines one or more portions of the image that are "still" and other portions of the image that are in motion. Based on the created map, decisions are made to "crop" some of the otherwise generated motion detection effects of recursive motion on pixels that should not be compensated for. By cropping out a portion or portions of the image that include pixels erroneously altered as an effect of motion detection, these improper motion effects applied to the detected non-motion pixels are eliminated, and the improper artifacts are reduced or eliminated altogether and not seen in the displayed image.

Along these lines, another decision based on the three types of motion detection can be made to avoid cropping under certain circumstances, such as when the recursive motion on one or more portions of the image are determined to be moving.

Figure 2:
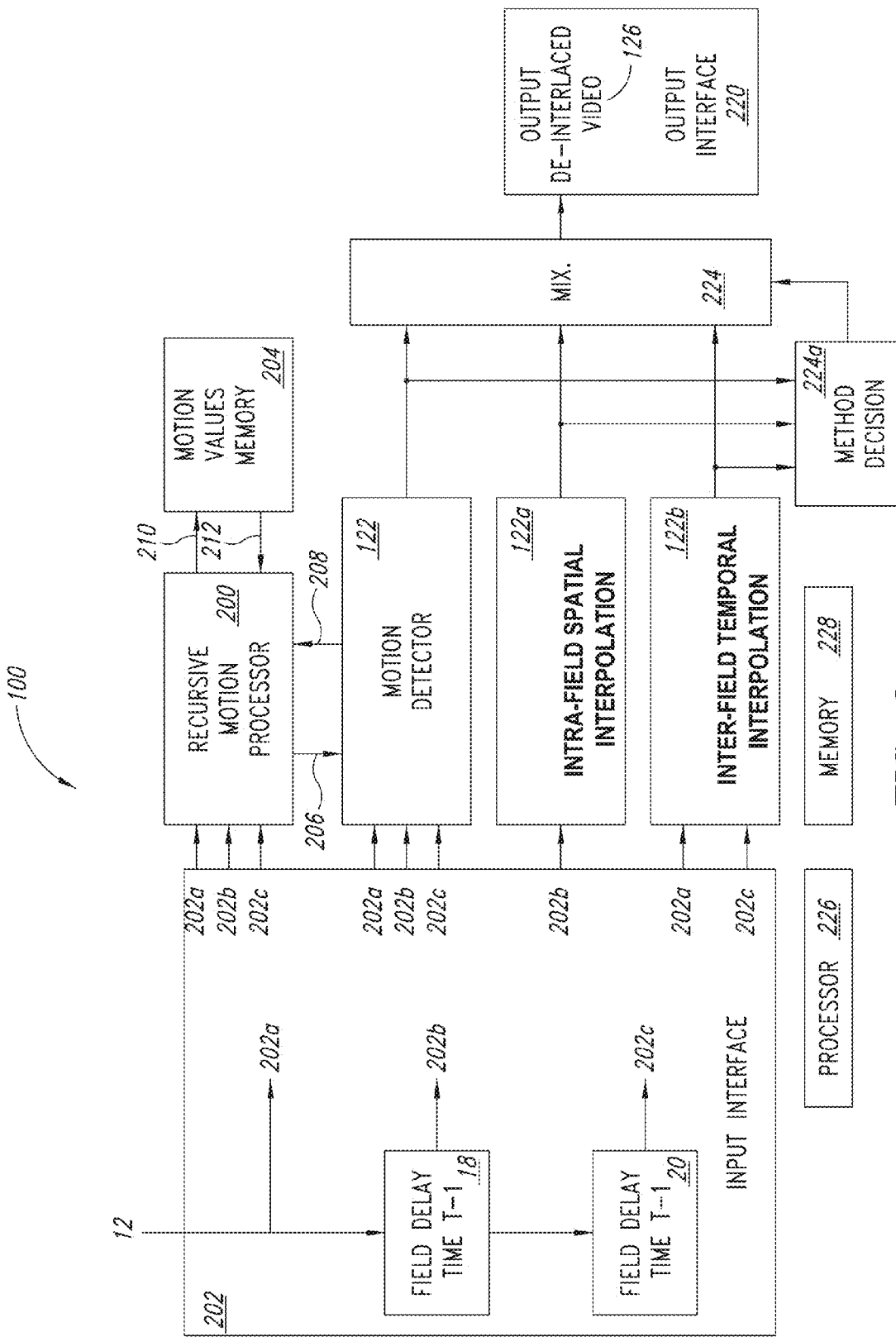
FIG. 2 is a system that receives interlaced video data, processes the data with a recursive motion processing circuit implementation, further processes the video data, and outputs displayable interlaced video data.

FIG. 2 is a system 100 that receives interlaced video data 12, processes the data with a recursive motion processing module 200 implementation, further processes the video data, and outputs displayable interlaced video data.

In system 100, an input interface module 202 includes logic to receive the input video data 12 and store copies of the input video data 1. The video data is then time-associated such that a first frame of video data is received at time T. When a second frame of data is received at a later point in time, the earlier received data is referenced as associated with time T−1, and the most recently received second frame is associated with time T. Later still, when a third frame of video data is received, the first frame is re-referenced as now associated with time T−2, the second frame is referenced as now associated with time T−1, and the most recently received third frame is associated with time T. In this way, the input interface may keep a rolling supply of data including current data, first delayed data (i.e., at time T−1), and second delayed data (i.e., at time T−2).

With respect to interlaced video data, fields of odd and even horizontal lines are alternately received. In this respect, if the video data of the current frame at time T comprises even lines of data, then it is understood that the video data of the second delayed data at time T−2 also comprises even lines of data and the first delayed data associated with time T−1 comprises odd lines of data. Correspondingly, if the current video data of time T comprises odd lines, then the delayed video data of time T−2 also comprises odd lines, and the delayed video data of time T−1 comprises even lines.

In the input interface module 202, the current data associated with time T is referenced as current video data 202*a*. The first delayed data, associated with time T−1, is referenced as first delayed video data 202*b*, and the second delayed data, associated with time T−2, is referenced as second delayed video data 202*c*. As evident in the input interface module 202, the current and delayed video data 202*a*-*c* is made available to other modules of the system 100.

Current video data 202*a*, first delayed video data 202*b*, and second delayed video data 202*c* passes from the interface module 202 to a motion detector module 122; first delayed video data 202*b* passes from the interface module 202 to an intra-field spatial interpolation module 122*a*; and current video data 202*a* and second delayed video data 202*c* passes from the interface module 202 to an inter-field temporal interpolation module 122*b*. In some optional implementations, the motion detector module 122, the intra-field spatial interpolation module 122*a*, and the inter-field temporal interpolation module 122*b* are arranged as an integrated motion detector. In other optional implementations, the recursive motion processor module 200 is also arranged as part of the integrated motion detector.

When odd fields of video data 12 are received and processed, a displayable frame of odd, horizontal lines of video data is produced. A horizontal line of empty space is left between each odd horizontal line. Correspondingly, when even fields of video data 12 are received and processed, a displayable frame of the even, horizontal lines of video data is produced. A line of empty space is also left between the video of each even line. In some systems, and in some circumstances, video data from an odd field is woven together such that there are no empty lines. I.e., the spaces between odd horizontal lines of video data are filled with video data from the even horizontal lines (thus, the spaces between the even horizontal lines of video data are filled with a video data from the odd horizontal lines). Since the video data of each field is captured at a different point in time, weaving techniques require more than merely combing together the video data of two fields. Instead, one or both of spatial and temporal analysis is performed on specific pixels of data.

An intra-field spatial interpolation module 122*a* is used to generate "between-line" pixels from video data (i.e., pixels) that is correct in time but otherwise has different spatial coordinates. In operation, the intra-field spatial interpolation circuit is coupled to the video data input interface module 202 to generate between-line pixels from video data that shares a common time parameter with pixels in an adjacent line. In some cases the interpolation techniques include a simple averaging of one or two pixels in the vicinity of the missing pixel; in other cases, complex techniques are applied using many pixels.

The temporal interpolation of inter-field temporal interpolation module 122*b* is also used to determine pixel values that fill the missing pixels on the display between lines of video data in odd fields (i.e., the even lines) or even fields (i.e., the odd lines). The inter-field temporal interpolation module 122b is coupled to the video data input interface module 202 and operates to create values for these in-between lines using pixels that are incorrect in time but have the correct spatial coordinates. That is, the pixels are generated by the inter-field temporal interpolation circuit from adjacent line pixels that share at least one common spatial parameter. It is recognized that, in many cases, temporal interpolation works reasonably well if the video data is composed substantially of static images. On the other hand, temporal interpolation is not very effective when the video data includes objects or background objects that are in motion.

In some cases, the intra-field spatial interpolation module 122a cooperates with the inter-field temporal interpolation module 122b to control a combination of spatial interpolation and temporal interpolation. In these cases, the pixels of the output frame are formed with spatial interpolation after detecting an object edge transition and with temporal interpolation based on motion detection or lack thereof in the relevant area of the image.

The motion detection module 122 is arranged to detect motion in displayable images. The motion detection module 122 is arranged to identify the edges of objects in a particular image and also whether the object in the scene is in motion. In addition, the motion detection module 122 is arranged to identify the edges of the display frame and whether the camera capturing the scene is in motion. In some cases, the motion detection module 122 simply assigns a binary yes/no value to each pixel indicating whether or not the pixel is in motion. In other cases, the motion detection module 122 also provides additional motion information such as a direction of the detected motion, a relative speed of the motion, whether the object is in motion against a still background or against a moving background, and other information.

The motion detection module 122 provides detected motion information 208 to the recursive motion processing module 200 and receives processed motion information 206 from the recursive motion processing module 200. The processed motion information 206 that is received indicates what type of motion if any has been detected in one or more portions of a displayable image video data; the types of motion including local still motion detection, recursive (i.e., repeating) motion detection, and feathering pattern detection. In some implementations, the processed motion information 206 includes a set of flags that are interpreted by the motion detection module 122. The motion detection module 122 is arranged to produce motion detection signals associated with video data from the current and delayed video data 202a-c in association with the processed motion information from the recursive motion processing module 200. In this way, the video data passed from the motion detection module 122 may be represented as motion detection video data.

A method decision module 224a operates as a selection circuit to a mixing module 224. The method decision module 224a receives input from the motion detection module 122, the intra-field spatial interpolation module 122a, and the inter-field temporal interpolation module 122b. The mixing module 224 applies particular weighting factors to produce a de-interlaced output video signal 126. The de-interlaced output video signal 126 is generated based on motion detected in the video data passed from the motion detection module 122, spatially interpolated video data from the intra-field spatial interpolation module 122a, and temporally interpolated video data from the inter-field temporal interpolation module 122b. Together, the method decision module 224a and the mixing module 224 are configured to operate on each pixel taking into account the motion detection information and a selection or combination of spatial and temporal interpolation information.

The de-interlaced output video signal 126 is passed through a video data output interface 220. The video data output interface 220 may simply be a signal conduit through which the de-interlaced output video signal 126 passes, such as may be the case when one or more portions of the multimedia receiving device system 100 are formed in a SoC or other integrated circuit. Alternatively, the video data output interface 220 may include circuitry or other logic to format the de-interlaced output video signal 126 for direct coupling to a display device, for transmission to another device, for storage in a memory device, or for some other purpose.

The recursive motion processing module 200 is coupled to a motion values storage repository 204, which may be comprised of flash memory, for example, or some other type of memory. Compressed motion data 210 is passed from the recursive motion processor module 200 to the motion values storage repository 204, and previous motion data 212 is retrieved from the motion values storage repository 204 and passed to the recursive motion processing module 200, as will be described.

The system 100 of FIG. 2 includes a processor 226 and a memory 228 associated with the processor 226. The processor 226 and memory 228 cooperate to carry out functions of the system 100.

The system 100 of FIG. 2 may be a multimedia receiving device such as a set-top box. Alternatively, system 100 may be another device such as a system on chip (SoC), application specific integrated circuit (ASIC), or some other structure. The system 100 includes at least one processor 226 (i.e., processing unit) arranged to execute computing instructions. In the present disclosure, a processor, such as processor 226 of FIG. 2, refers to one or more processing units individually, shared, or in a group, having one or more processing cores (e.g., execution units), including central processing units (CPUs), digital signal processors (DSPs), microprocessors, microcontrollers, state machines, and the like that execute computing instructions. Computing instructions are stored in a memory such as memory 228 of FIG. 2. In the present disclosure, memory may be used in one configuration or another. The memory may be configured to store data. In the alternative or in addition, the memory may be a non-transitory computer readable medium (CRM) wherein the CRM is configured to store instructions executable by a processor. The instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of the systems, methods, and apparatus described in the present disclosure.

Figure 3:
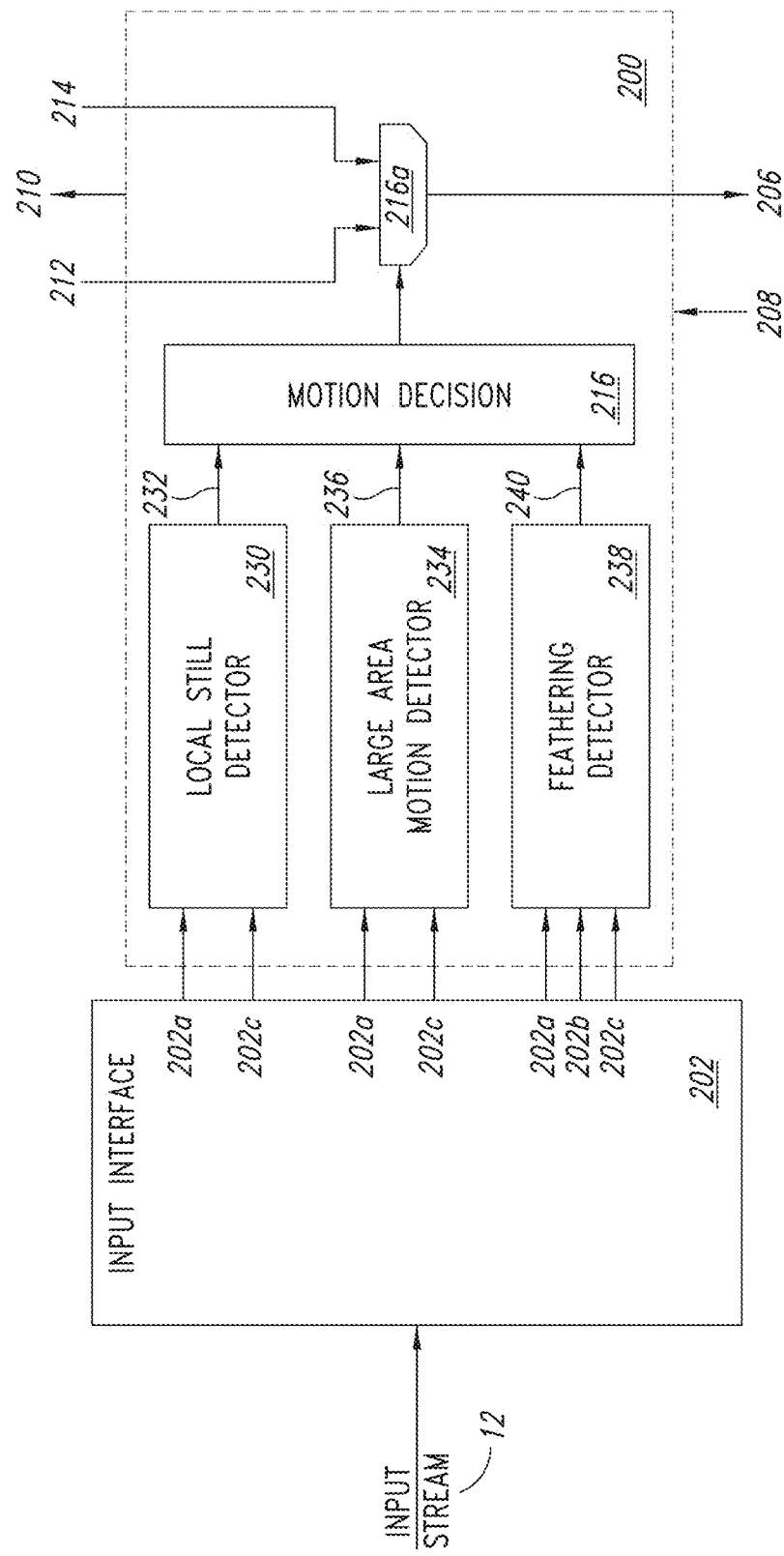
FIG. 3 is a recursive motion processing circuit implementation.

FIG. 3 illustrates an implementation of a recursive motion processing module 200 in more detail. In FIG. 3, odd and even interlaced video fields of video data 12 are received by the input interface module 202, which provides the current input video 202a at time T, the first delayed input video 202b at time T−1, and the second delayed input video 202c at time T−2. The input video is provided to the recursive motion processing module 200 via the input interface 202 coupled to an interface of the recursive motion processing module 200 such as is shown in FIG. 3.

In addition to the interface coupled to input interface 202, the recursive motion processing module 200 includes other interfaces over which information is passed to and from the module. Five additional interfaces are illustrated in FIG. 3, but more or fewer are contemplated. It is recognized that the interfaces may be formed as a simple conduit of a circuit, or the interfaces may comprise a plurality of conduits, circuitry and other logic such as software, electromechanical ports, and the like. It is further recognized that any or all of the interfaces may be formed within or integrated with the recursive motion processing module 200, and any or all of the interfaces may be separate and distinct from the motion processing module 200. A first illustrated interface is arranged to pass the processed motion information 206, a second illustrated interface is arranged to pass detected motion information 208 a third illustrated interface is arranged to pass compressed motion data 210, a fourth illustrated interface is arranged to pass previous motion data 212, and a fifth illustrated interface is arranged to pass zero motion data 214.

The recursive motion processing module 200 of FIG. 3 includes a local still detector module 230, a large area motion detector (LAMD) module 234, and a feathering detector module 238. The recursive motion processing module 200 further includes a motion decision module 216 which receives still (i.e., no detected motion) information 232 from the local still detector module 230, motion information 236 from the LAMD module 234, and feathering information 240 from the feathering detector module 238. The motion decision module 216 provides selection information to a motion decision logic circuit 216a, which is arranged to pass either previous motion data 212 or zero motion data 214 from the recursive motion processing module 200 as the processed motion information 206.

In some cases, the processed motion information 206 includes one or more flags associated with the features of the recursive motion processing module 200. For example, a simple binary flag may indicate that no additional motion processing is necessary. Alternatively, or in addition, a set of flags may indicate what type of additional processing was performed or is necessary, or whether the motion detection module 122 is directed to crop one or more portions of an image. In some implementations, the processed motion information may even include video data information such as an image or a portion of an image that has been corrected.

The detected motion information 208 is optional and may not be provided in some implementations. In other cases, the detected motion information 208 may include a simple flag or a more complex set of flags that indicate where in particular images motion has been detected by the motion detection module 122 or one of its sub-modules, the intra-field spatial interpolation module 122a, or the inter-field temporal interpolation module 122b. The detected motion information 208 may also include threshold data, noise kill level data, video image data, and other information.

Video data information, which may include information associated with individual pixels, is passed as compressed motion data 210, previous motion data 212, and zero motion data 214. The information may be associated with entire images or one or more portions of an image.

Figure 4:
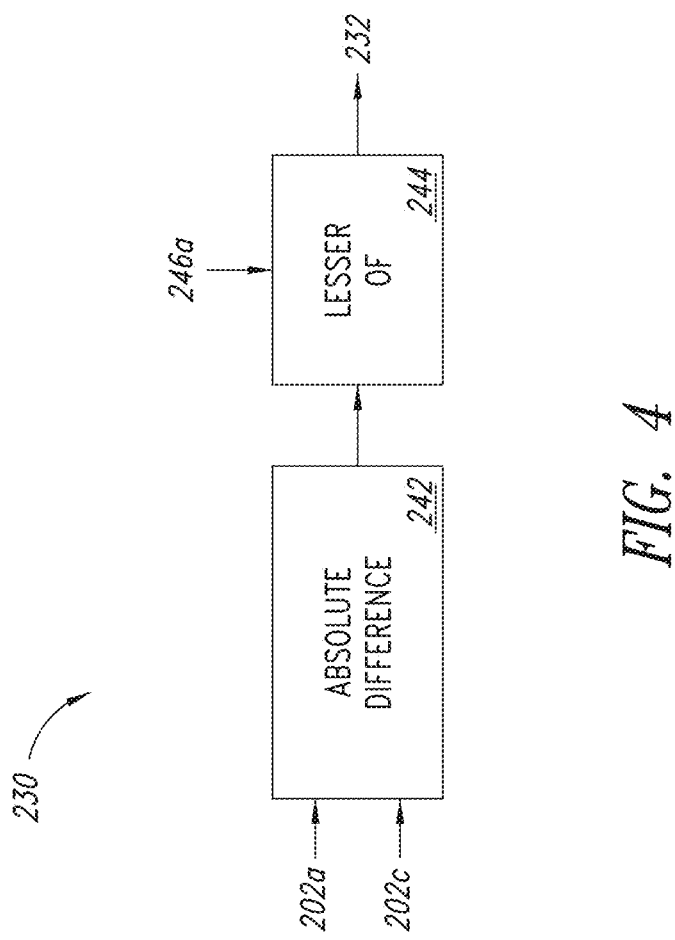
FIG. 4 is a local still detector circuit implementation.

FIG. 4 is a local still detector module 230 implementation, such as the local still detector 230 of FIG. 3. The local still detector module 230 includes an algorithmic combination module 242 and a comparator module 244. The algorithmic combination module 242 is configured in FIG. 4 to calculate an absolute difference between two input values, though other formulas are considered. The comparator module 244 may perform a "lesser of" function as illustrated in FIG. 4 or the comparator module 244 may perform a different comparison.

The local still detector module 230 operates to determine whether a portion of an image is in motion or perceived to be in motion. At a field level, block level, pixel level, or some other level, current video data 202a is algorithmically combined with delayed video data to determine an absolute difference. The delayed video data in the implementation of FIG. 4 is the second delayed video data 202c, but a combination with the first delayed video data 202c or other delayed video data is also contemplated.

Subsequently, the absolute difference value is compared with first noise kill information 246a to produce a binary yes/no "still flag." The still flag may comprise some or all of still motion 232. The still flag indicates whether or not the analyzed field, block, pixel, or other portion of the image is still or is in motion. In some implementations the current video data 202a is algorithmically combined.

In some cases the first noise kill information 246a is set to a reasonably low value. By setting the first kill noise information 246a to a reasonably low value, the local still detector module 230 is arranged to detect a small amount of motion. Information indicating the detection of a small amount of local motion permits the system to reduce or remove motion-caused halo artifacts.

FIGS. 5A-5D are optional implementations of large area motion detectors (LAMDs) such as the LAMD module 234 of FIG. 3.

FIG. 5A is a first LAMD implementation 234a. The LAMD implementation 234a couples together an algorithmic combination module 242, a first comparator module 244, an aggregation module 250a, a second comparator module 252, and an LAMD post processing module 254. In the implementation, current video data 202a and delayed video data pass through an algorithmic combination module 242 to produce, for example, an absolute difference value. The delayed video data may be first delayed video data 202b, second delayed video data 202c, a combination of first and second delayed video data, or some other delayed video data. In some implementations, the combination of current video data 202a and second delayed video data 202c is desirable because the video data represents consecutive odd fields or consecutive even fields of interlaced video data.

The algorithmic combination of current and delayed input data in LAMD implementation 234a produces an output that is compared with second noise kill information 246b.

The comparator module 244 produces a sequence of motion values that represent the amount of motion that occurs between corresponding portions of current and delayed video data when the amount is above a particular threshold (i.e., second noise kill level information 246b). Stated differently, if the amount of motion between the particular portion of current and delayed video is above the second noise kill level information 246b, then an indication of such motion is passed from the comparator module 244. Alternatively if the amount of motion is not above the second noise kill level information 246b, then an indication of such lack of motion is passed from the comparator module 244. In some cases the information flowing from the comparator module 244 is a sequence of binary values. In other cases, the information from comparator module 244 is a sequence of variable numbers wherein the size of the number indicates the amount of motion between the current video data in the delayed video data.

The values from the comparator module 244 are aggregated in an aggregation module 250a. In the LAMD implementation 234a of FIG. 5A, the aggregation module 250a is arranged to perform a sum-over-window operation. In this case, the "window" refers to a large area such as all of the pixels in an entire field. In this way, the amount of motion in the entire window is detected. The output of the aggregation module 250a comprises block motion pixels number information 262. Particularly, the block motion pixels number information 262 includes an identification of pixel blocks that are in motion within the window under analysis.

The block motion pixels number 262 is passed to another comparator module 252 where it is compared to first threshold information 258a. If the motion indicated in the block motion pixels number 262 rises above the threshold, then the block motion pixel number 262 is passed on to an LAMD post processing module 254. Alternatively, instead of the block motion pixel number 262, the first threshold information 258 is passed to the LAMD post processing module. In some cases, the operations between the aggregation module 250a, the comparator module 252, and the post processing module 254 are iterative.

Figure 6:
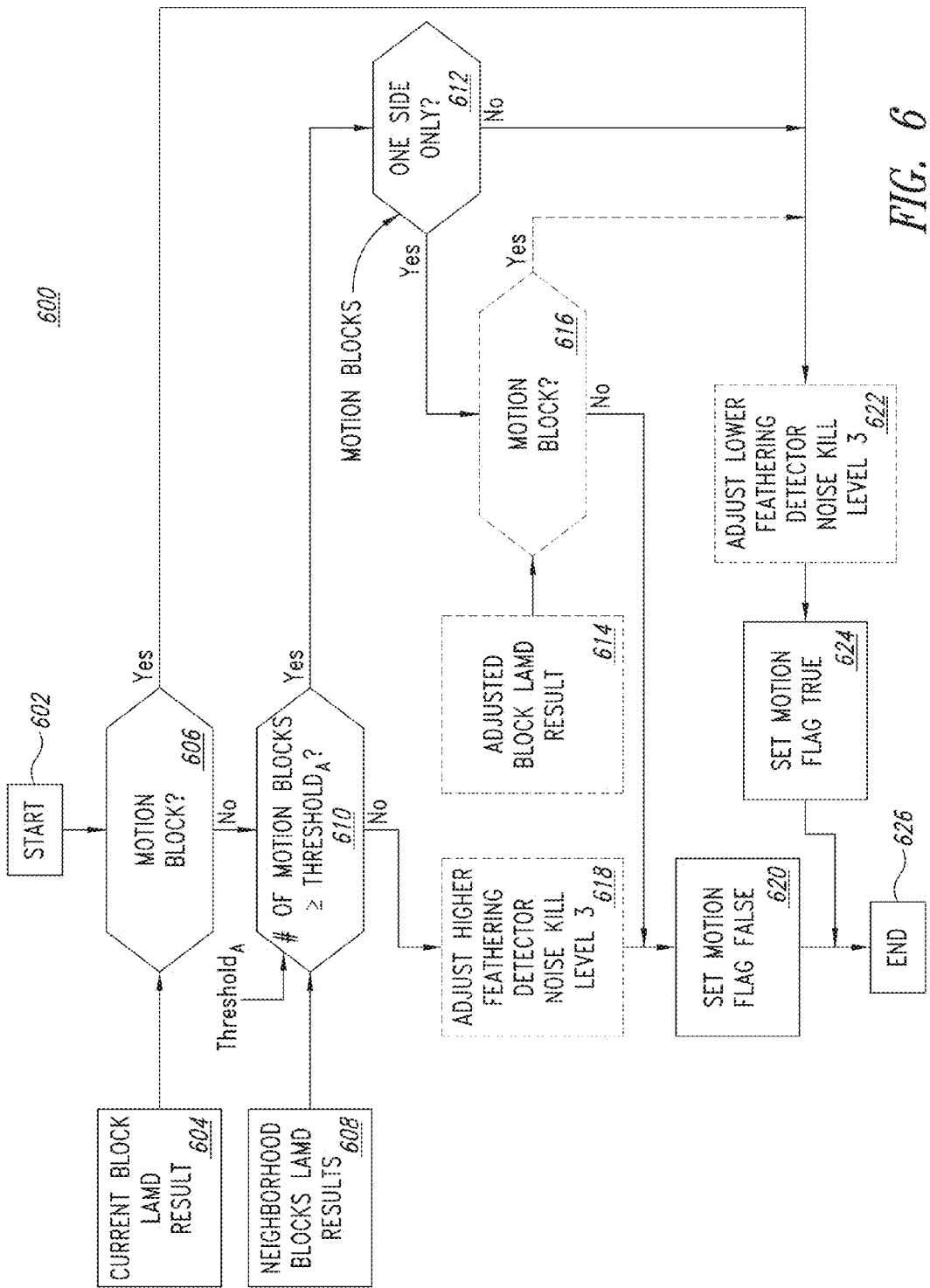
FIG. 6 is a processing algorithm for an enlarged motion detection implementation.
Figure 7:
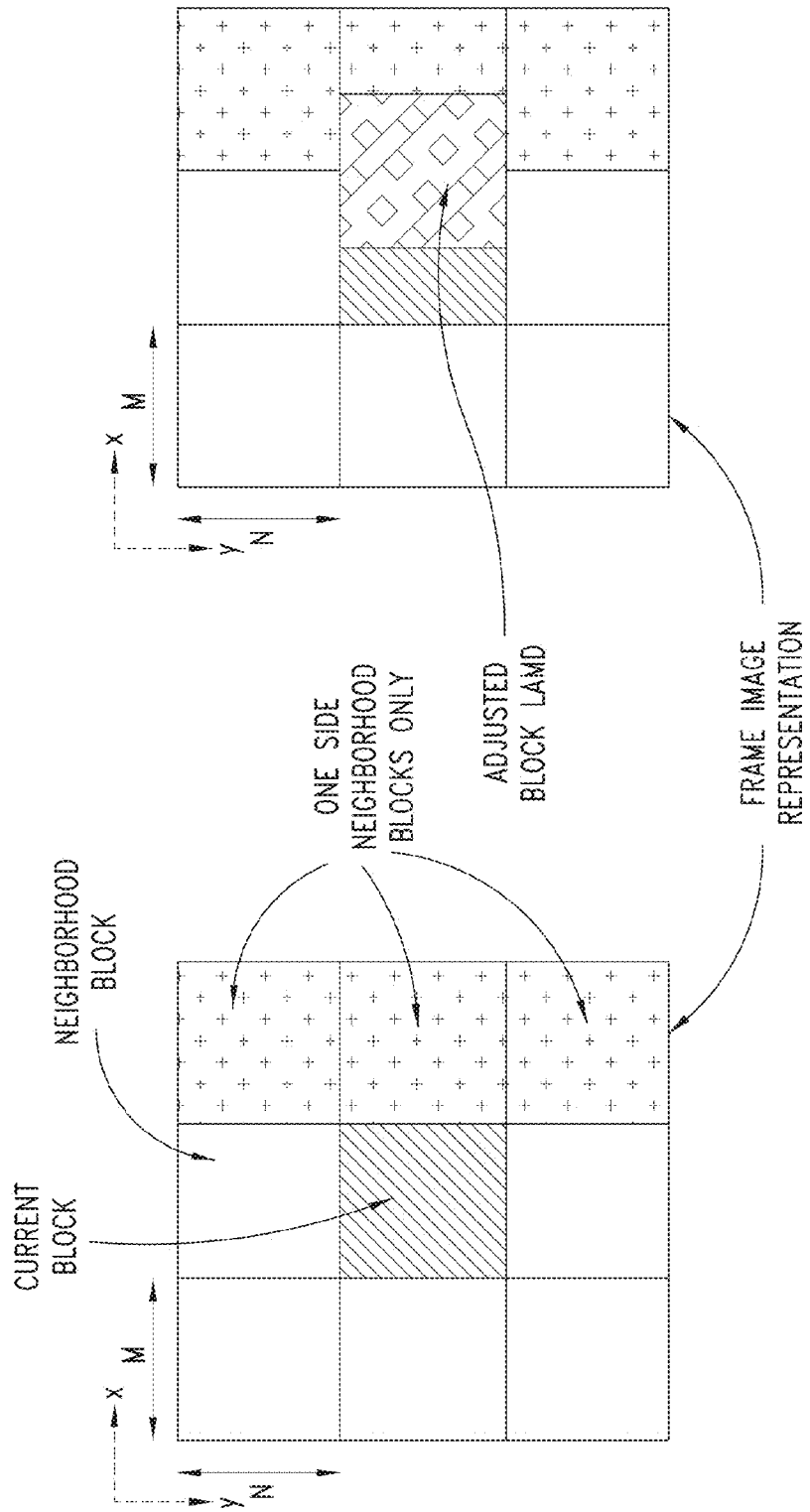
FIG. 7 shows an exemplary current block, neighborhood blocks, and an adjusted block.

Operations of an exemplary LAMD post processing module implementation are illustrated in FIGS. 6 and 7. Generally speaking however, when a particular area of interest is analyzed, surrounding areas of interest are also analyzed in order to determine whether the area of interest should be modified according to detected motion information. For example, if the area of interest is a block, then eight adjacent blocks surrounding the block of interest may be analyzed. Considering the central block of interest, along with the height of a block above, the height of a block below, the width of a block to the left and the width of a block to the right, the effective analysis of a 3-block by 3-block area because an analysis of three times the current block (FIG. 7).

FIG. 5B is a second LAMD implementation 234b. The LAMD implementation 234b includes structures common to those of the first LAMD implementation 234a, and the description of such structures will not be repeated for brevity. It is recognized that in some cases both implementations 234a and 234b may be formed in the same device and may share certain structures. In such embodiments, wherein LAMD structures are shared, the multiple implementations will often execute motion detection functions separately and not concurrently. In this way, configurable parameters may be used to configure the LAMD implementation for a particular operation.

The second LAMD implementation 234b includes a different aggregation module from that of the first LAMD implementation 234a. In particular, aggregation module 250b is arranged to perform a sum-over-block operation. In one case, the block has a defined size, 16 by 8 pixels, for example. In other cases a different block size is used, such as 64 by 32 pixels or 128 by 64 pixels. In some cases, the defined size of the block of pixels is adjustable. Another difference between the first and second LAMD implementations is the threshold applied in the comparator module 252. In the second LAMD implementation 234b, second threshold information 258b may be different from first threshold information 258a. Yet one more difference between the first and second LAMD implementations is the inclusion of a field delay buffer 256 in the second LAMD implementation 234b between the comparator module 252 and the post processing module 254.

Figure 5C:
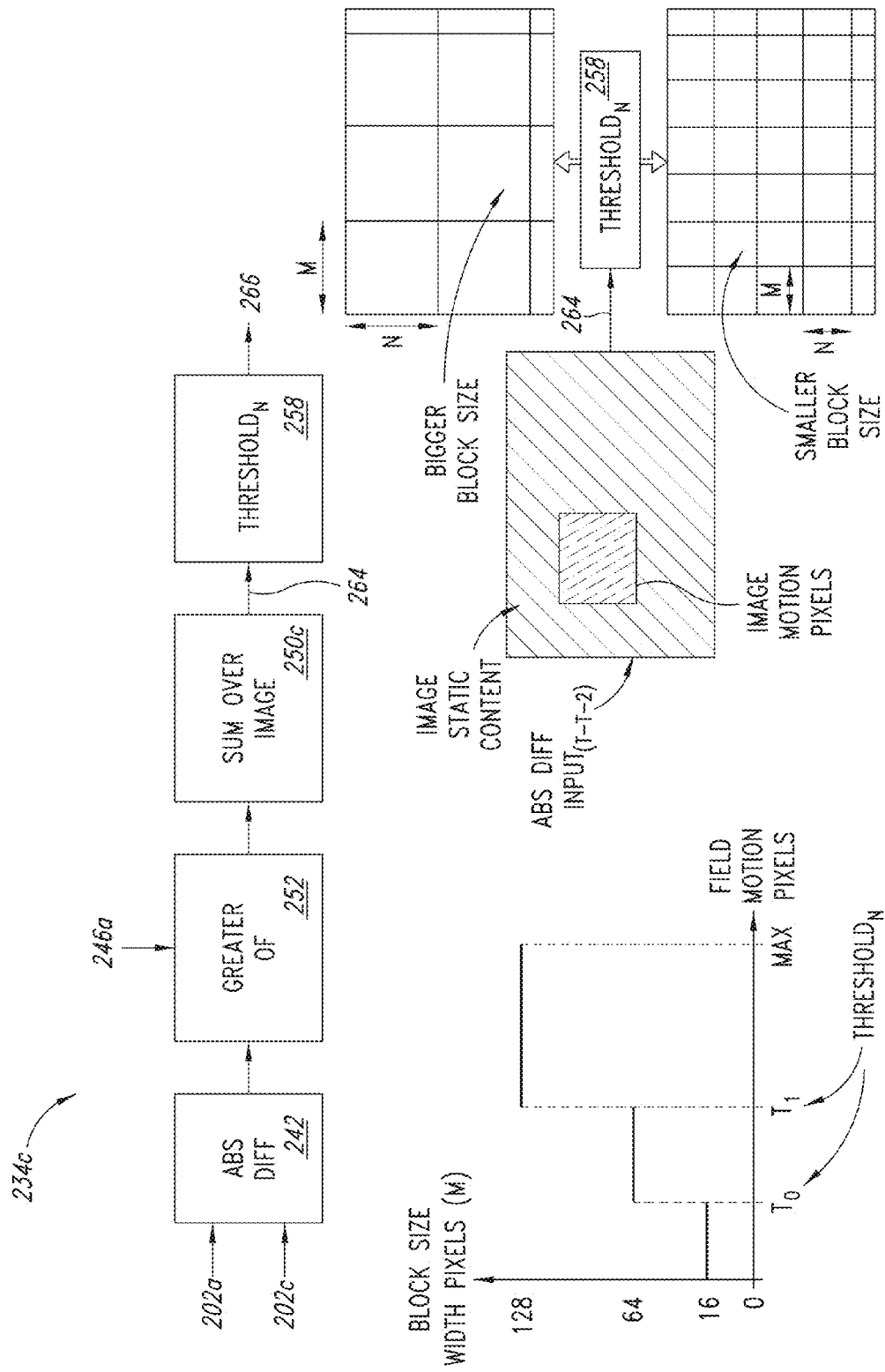

FIG. 5C illustrates a third LAMD implementation arranged to perform a block size operation. The third LAMD implementation 234c couples together an algorithmic combination module 242, a second comparator module 252, an aggregation module 250c, and a threshold information storage repository 258. In the implementation, current video data 202a and delayed video data pass through an algorithmic combination module 242 to produce, for example, an absolute difference value. The delayed video data may be first delayed video data 202b, second delayed video data 202c, a combination of first and second delayed video data, or some other delayed video data. In some implementations, the combination of current video data 202a and second delayed video data 202c is desirable because the video data represents consecutive odd fields or consecutive even fields of interlaced video data.

The comparator module 252 is arranged in the implementation of FIG. 5C to compare the information from the algorithmic combination module 242 to the first noise kill information 246a, and to pass the greater of the two to an aggregation module 250c. The aggregation module 250c in the third LAMD implementation 234c is arranged to carry out a sum-over-image operation. The output of the aggregation module 250c includes field motion pixels number information 264, which is stored in the threshold information storage repository 258, which may be a local or remote memory device.

The operations of the large area motion detector (LAMD) implementations are iterative in that video data passed into a particular system includes a stream of interlaced fields. In operation, the LAMD implementations reach free block size information 266 for next sequential instances of processing.

FIG. 5C also illustrates the relationship between various blocks, fields, and images with respect to the storage and retrieval of threshold information from the threshold information storage repository 258. A size and threshold relationship plot is illustrated having a block size width pixels (M) scale located on a y-axis and a threshold number of field motion pixels on an x-axis. Various block sizes are illustrated including a block of width M=16, a block of width M=64, and a block of width M=128. A relative distinction between the number of field motion pixels in a first threshold $T_0$ and second threshold $T_1$ is also shown.

As discussed herein, the LAMD implementation is arranged to perform a block size selection operation. Video data of a field is illustrated wherein image static content is detected and image motion pixels are detected. Based on size and area of pixels in motion that have been detected (i.e., image motion pixels) using the algorithmic combinational module 242 and aggregation module 252, a field motion pixels number 264 is passed into the threshold information storage repository 258. It is recognized that various block sizes, which are illustrated in FIG. 5C as a smaller block size or bigger block size, may be selected.

Figure 5D:
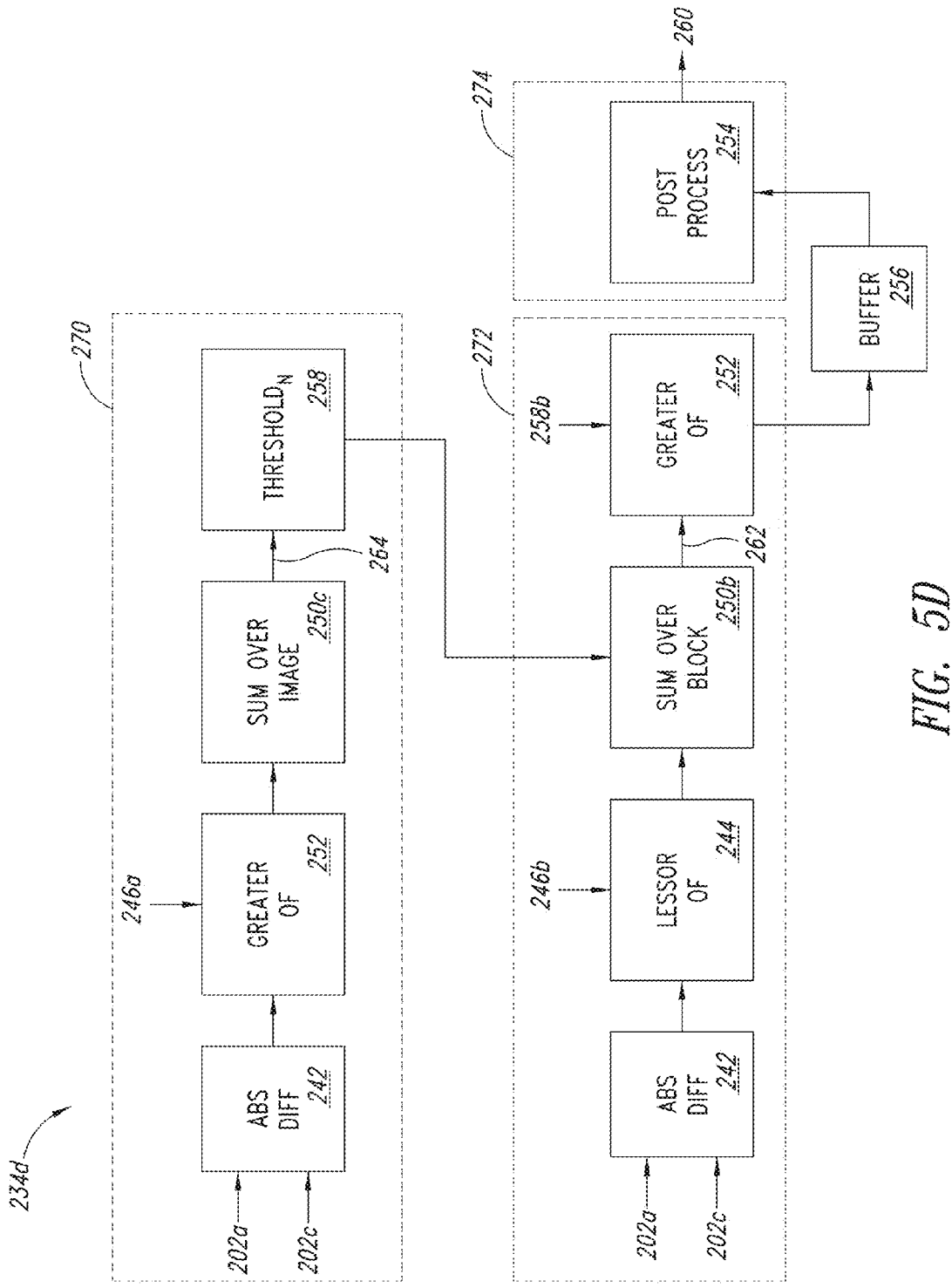

FIG. 5D is a fourth implementation of an LAMD implementation 234d, which integrates features of the second and third implementations. The LAMD implementation 234d processes the incoming video data in stages. A first stage includes logic that performs a current instance of video data processing 274, a second stage that performs a first previous instance of video data processing 272, and a third stage that performs a second previous instance of video data processing 270.

As illustrated in FIG. 5D, the second previous instance of video data processing 270 accepts current video data information and delayed video information and acts according to the characteristics of the third LAMD implementation 234c (FIG. 5C). The second previous instance of video data processing 270 passes block size threshold information to the next instance, which is the first previous instance of video data processing 272. Finally, the first previous instance of video data processing 272 passes either the block motion pixel number 262 information or the second threshold information 258b to the post processing module 254 via the field or frame delay buffer 256.

FIG. 6 is a processing algorithm for an enlarged motion detection implementation. FIG. 7 shows an exemplary current block, neighborhood blocks, and an adjusted block. The processing of FIG. 6 is described in association with the block illustrations of FIG. 7.

In FIG. 7, an area of interest is identified as a "current block." The current block is analyzed in association with eight surrounding blocks, each of which is adjacent to the current block. FIG. 7 illustrates each block as being identically sized; however, it is recognized that adjacent blocks may be of different sizes in some implementations. That is, in some cases, processing efficiencies may be recognized when larger or smaller blocks are analyzed with the current block.

Two sets of axes are illustrated in FIG. 7. A first set of axes, M and N, represent numbers of pixels. M and N are integers. Exemplary values of M and N are 8, 16, 32, 64, and 128, though other values are also considered. In the illustration of FIG. 7, M and N have a 1-to-1 ratio such that the value of M is the same as the value of N. Other ratios are also recognized. That is, the blocks of FIG. 7 may be square, as illustrated, or the blocks may be rectangular.

Considering that the processing of the present disclosure is directed to input video data that is interlaced and output video data that is de-interlaced, the video data blocks of FIG. 7 are understood to illustrate de-interlaced video data that has undergone some level of processing based on detected motion. The procedures of the present disclosure are generally directed toward the reduction or removal of undesirable artifacts produced in association with conventional motion detection processing. Accordingly, even though FIG. 7 illustrates processing associated with de-interlaced video data, it is recognized that the structures and methods of the present disclosure may also operate on interlaced video data prior to de-interlacing.

The second set of axes in FIG. 7 include an x-axis and a y-axis. The x-axis represents video data in a horizontal line of the displayable frame of video data. The y-axis represents video data in a vertical column of the displayable frame of video data.

In FIG. 7, portions of two frame images are shown. The illustrated portion illustrates nine blocks of video data of a first image, and nine blocks of video data of a second image. In some cases, all eight adjacent blocks around a current block are analyzed. In some cases, a single neighborhood block is analyzed. In still other cases, only one side of neighborhood blocks are analyzed. Accordingly the analysis of an area of interest represented by a current block in FIG. 7 may be adjusted based on particular motion detection or for other reasons. Based on the large area motion detection (LAMD), the portion of the image in the second frame recognizes an adjustment of video data of the current block.

The processing of FIG. 6 may be performed within the large area motion detection (LAMD) post processing module 254 of FIGS. 5A-5D in cooperation with other LAMD processing modules. Processing begins at 602.

At 604 and 606, a current block LAMD result is analyzed to determine if motion is detected and motion processing is performed or necessary. Such analysis at 606 may be performed as indicated in FIG. 7 to include adjacent blocks around a current block of interest. If such motion is detected, processing advances to optional processing block 622. Alternatively, if no motion has been detected, processing falls through to 608, 610.

At 608, 610, the results of neighborhood block LAMD processing is analyzed against a particular threshold. The analysis includes a determination whether the number of motion blocks rises to a particular threshold. With respect to FIG. 7, a current block and its eight adjacent and surrounding blocks may be analyzed. In one implementation, the Threshold$_A$ value is set to five (5), and the process determines if motion is detected in at least five blocks. Threshold$_A$ may optionally be set to other values.

If the threshold at 610 is not met, processing advances to optional block 618. Alternatively, if the threshold is met, processing advances to 612 wherein it is determined if motion is detected on only one side of the current area of interest. If motion is detected on more than one side, processing falls to optional block 622. Alternatively, if motion is detected on only one side, processing advances to optional blocks 614, 616. At 614, 616, an unadjusted block LAMD result may be recalculated with adjusted coordinates. This readjustment may be based for example on the adjusted block as shown in the adjusted block shown in the right portion of FIG. 7. The recalculation at 614 may be used to determine if motion is detected at 616. If motion is detected, processing advances to optional block 622. Alternatively, if motion is not detected, processing advances to 620.

In the processing of optional block 618, which is reached when the number of motion blocks does not meet the threshold at 610, a threshold level for a feathering detector is adjusted higher. The threshold level in the feathering detector is applied in a feathering detector such as the feathering detector 238 of FIG. 3 and FIG. 8. Conversely, in the optional processing block 622, the threshold level for the feathering detector is adjusted lower. The threshold level in the feathering detector 238 may be applied as noise kill information 246c.

At 620, a motion flag, which may comprise some or all of motion information 260, is set to false. At 624, the motion flag is set to true. The motion information 260 is generally provided as an output from a large area motion detector such as LAMD 234a, 234b, 234d of FIGS. 5A, 5B, 5D.

Figure 8:
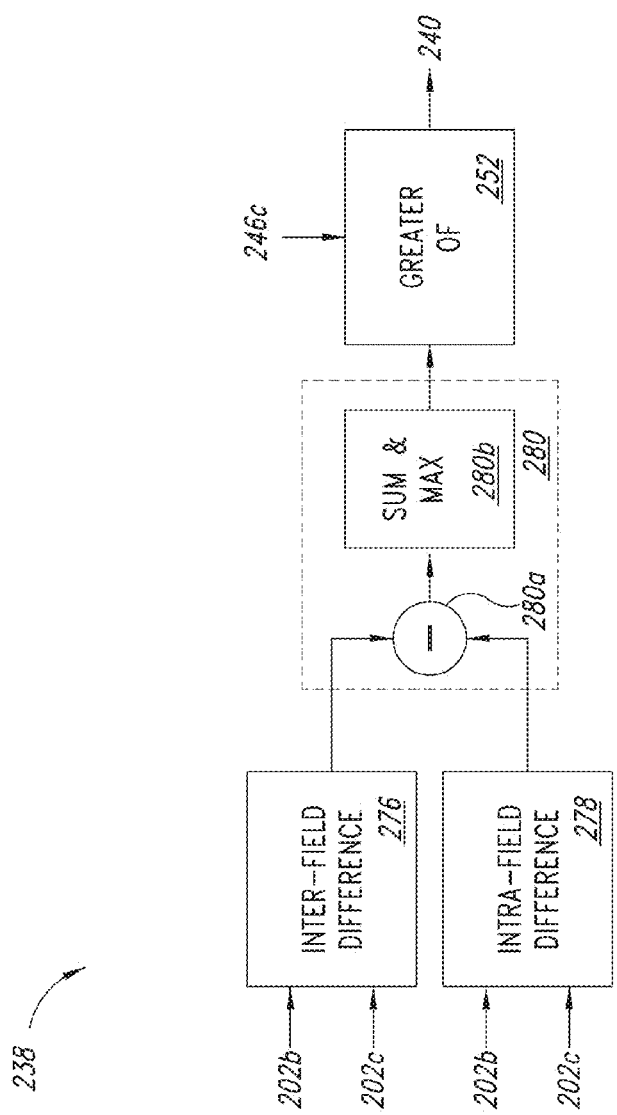
FIG. 8 is a feathering detector circuit implementation.

FIG. 8 is a feathering detector circuit implementation, such as the feathering detector module 238 of FIG. 3. The feathering detector module 238 includes an inter-field difference module 276, an intra-field difference module 278, a math circuit 280 having a subtraction unit 280a and a quantization circuit 280b, and a comparator module 252.

In the feathering detector module 238, the inter-field difference module 276 and intra-field difference module 278 each receive first delayed video data 202b and second delayed video data 202c at their respective inputs. The inter-field difference module 276 is arranged to identify particular differences of video data in corresponding but different fields. The identified inter-field differences are attributable to detected motion, and the identified inter-field differences are passed as inter-field output data to the subtraction unit 280a of the math circuit 280. The intra-field difference module 278 is arranged to identify particular differences of video data in adjacent areas within a single frame. The particular intra-field differences are passed as intra-field output data to the subtraction unit 280a of the math circuit 280. Differences between the output of the inter-field difference module 276 in the output of the intra-field difference module 278 are areas of interest where improper feathering artifacts may exist. The differences from the subtraction unit 280a are accumulated in the quantization circuit 280b over a particular period of time, which may be the processing time of one or more frames of incoming video data 12. The quantization circuit 280b then identifies areas in the video data where feathering artifacts are likely. The data from the quantization circuit 280b is compared in a comparator module 252 to third noise kill information 246c, which may include one or more sets of different values as directed to motion values over a large area. The output of comparator module 252 produces feathering information 240.

Figure 9:
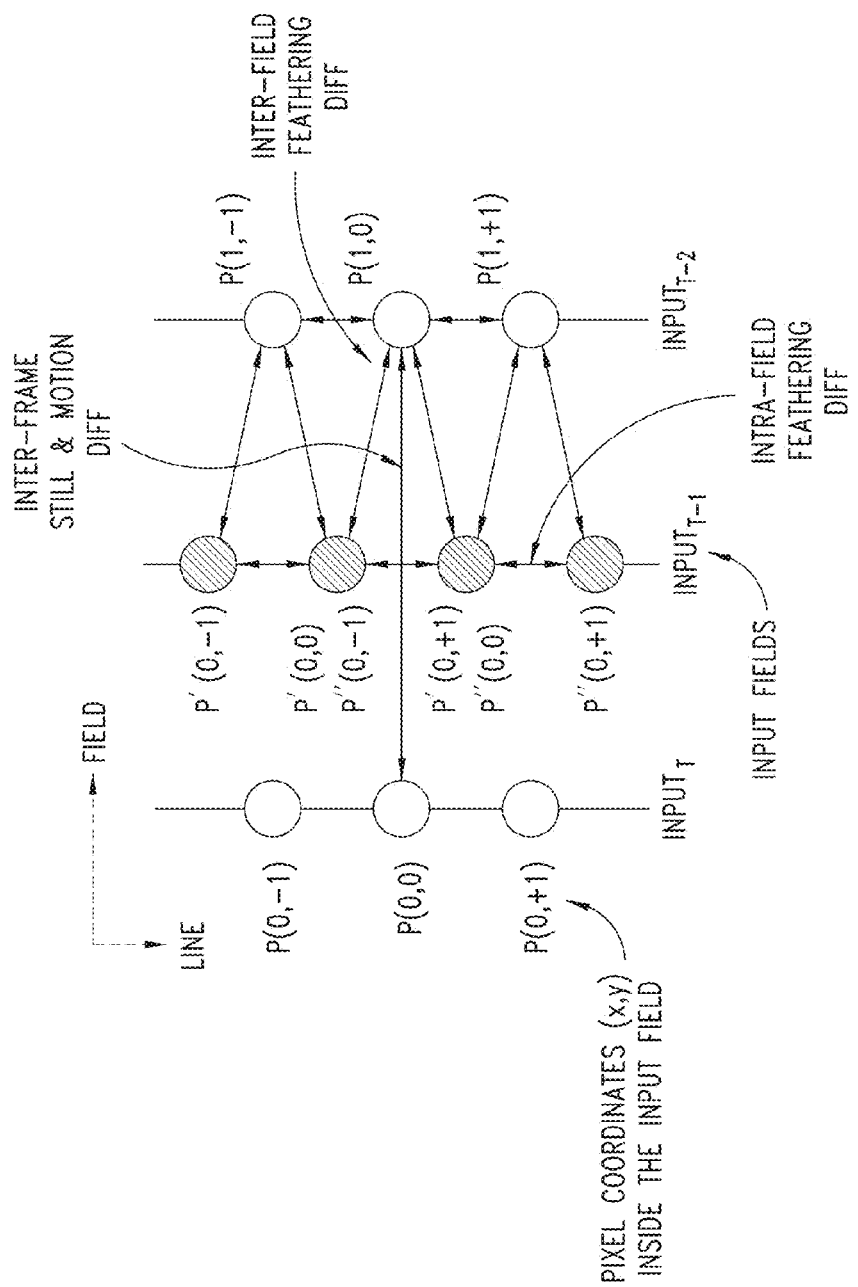
FIG. 9 shows exemplary pixels and windows using applied difference calculations.

FIG. 9 shows exemplary pixels and windows using applied difference calculations. The exemplary pixel data of FIG. 9 is representative of video information within video data 202a, 202b, 202c. Various figures in the present disclosure include logic modules that perform various algorithmic combinations. In some modules, such as the algorithmic combination module 242 of FIGS. 5A-5D, the algorithmic combination module performs an absolute difference calculation. Inter-field difference module 276 (FIG. 8) and intra-field difference module 278 (FIG. 8) also perform difference calculations. To these modules and others, the teaching of FIG. 9 may be suitably applied.

Data included in video data 12 (FIGS. 1-3) may be represented as pixel P(0,0) in FIG. 9. Pixel P(0,0) may in some cases be raw video data. Pixel P(0,0) may in other cases be processed video data, such as video data generated as part of a motion detection operation, a motion estimation operation, or some other operation.

In FIG. 9, relative to pixel P(0,0), adjacent pixels on different horizontal lines are illustrated, and accordingly, a "LINE" axis is indicated.

Pixel P(0,−1) is adjacent to pixel P(0,0) on a previous line.
Pixel P(0,+1) is adjacent to pixel P(0,0) on a next line.
Also in FIG. 9, relative to pixel P(0,0), corresponding pixels in different frames are illustrated, and accordingly, a "FIELD" axis is indicated. The leftmost column of pixels in FIG. 9 represents video data from a first frame, which may be odd or even.

The central column of shaded pixels in FIG. 9 represents video data from a next sequential frame, which has an opposite polarity as the first frame. That is, if the first frame (i.e., unshaded pixels) is an odd frame, then the second frame (i.e., shaded pixels) is an even frame. Alternatively, if the first frame is an even frame, then the second frame is an odd frame.

The rightmost column of pixels in FIG. 9 represents video data from a next sequential frame. This third sequential frame has the same polarity as the first frame. The pixels in the first (left) column represent video data at one point in time. The pixels in the second (central) and third (right) columns represent corresponding video data that is temporally shifted.

Recognizing that the incoming video data 12 is interlaced, and that video data of one polarity (i.e., odd or even) fills the spaces in between horizontal lines of video data of the other polarity (i.e., even or odd, respectfully), it is recognized that the video data of the shaded pixels in the central column of FIG. 9 may correspond to a horizontal line above or a horizontal line below the video data of the unshaded pixels in the leftmost column. In this respect, the shaded pixels of the central column that represent data in the line above are designated [P'], and the shaded pixels of the central column that represent data in the line below are designated [P"]. Thus, it is apparent in FIG. 9 that the leftmost column includes three pixels: a middle pixel P(0,0), a pixel above P(0,−1), and a pixel below P(0,+1). Correspondingly, in the central column of shaded pixels, one set of three pixels may be considered as a middle pixel P'(0,0), a pixel above P'(0,−1), and a pixel below P'(0,+1). Another set of three pixels may be considered as a middle pixel P"(0,0), a pixel above P"(0,−1), and a pixel below P"(0,+1). In order to detect particular motion, the video data representing a pixel of interest is analyzed along with adjacent pixels of the same frame and corresponding and adjacent pixels of other frames.

FIG. 9 illustrates difference calculations performed in the various modules of the present disclosure. The difference calculations are used to identify particular relationships in the video data that represents a particular pixel. Solid lines that are terminated by arrows in FIG. 9 represent different calculations. That is, each solid line indicates a difference calculation wherein the arrows point to the video data representing a particular pixel to be used as an operand.

In FIG. 9, three specific difference operations are identified: an INTER-FRAME STILL & MOTION difference, an INTER-FIELD FEATHERING difference, and an INTRA-FIELD FEATHERING difference. Several more difference operations are illustrated and still other difference operations are contemplated.

The INTER-FRAME STILL & MOTION difference illustrates an algorithmic calculation performed using the video data representing pixel P(0,0) and pixel P(1,0). The two pixels are in the same place in the same line in the current coordinates but in different lines considering the final de-interlaced video data. When there is no difference between the video data, it may be understood that the pixel is not representing any motion. That is, the same color and intensity represented by the pixel in one frame does not change in the next frame. Alternatively, a difference between the video data will indicate to the different color or intensity and the need to illuminate the pixel differently between one frame and the next.

The INTER-FIELD FEATHERING difference shows an algorithmic difference calculation between video data in different fields and in different lines. The calculation is performed on video data in fields of different polarity, but it is understood that performing the calculation on video data of different fields having the same polarity is also considered. In FIG. 9, the illustrated calculation is performed between a pixel P'(0,0) and pixel P(1,0), which is in the line below. It is understood that inter-field feathering difference calculations are also performed between pixel P"(0,0) and pixel P(1,0), which is in the line above.

The INTRA-FIELD FEATHERING difference is an algorithmic difference calculation between pixels in different lines of the same field. A calculation between pixels P"(0,0) and P"(0,+1) is identified, and it is understood that other such calculations are also performed.

Figure 10:
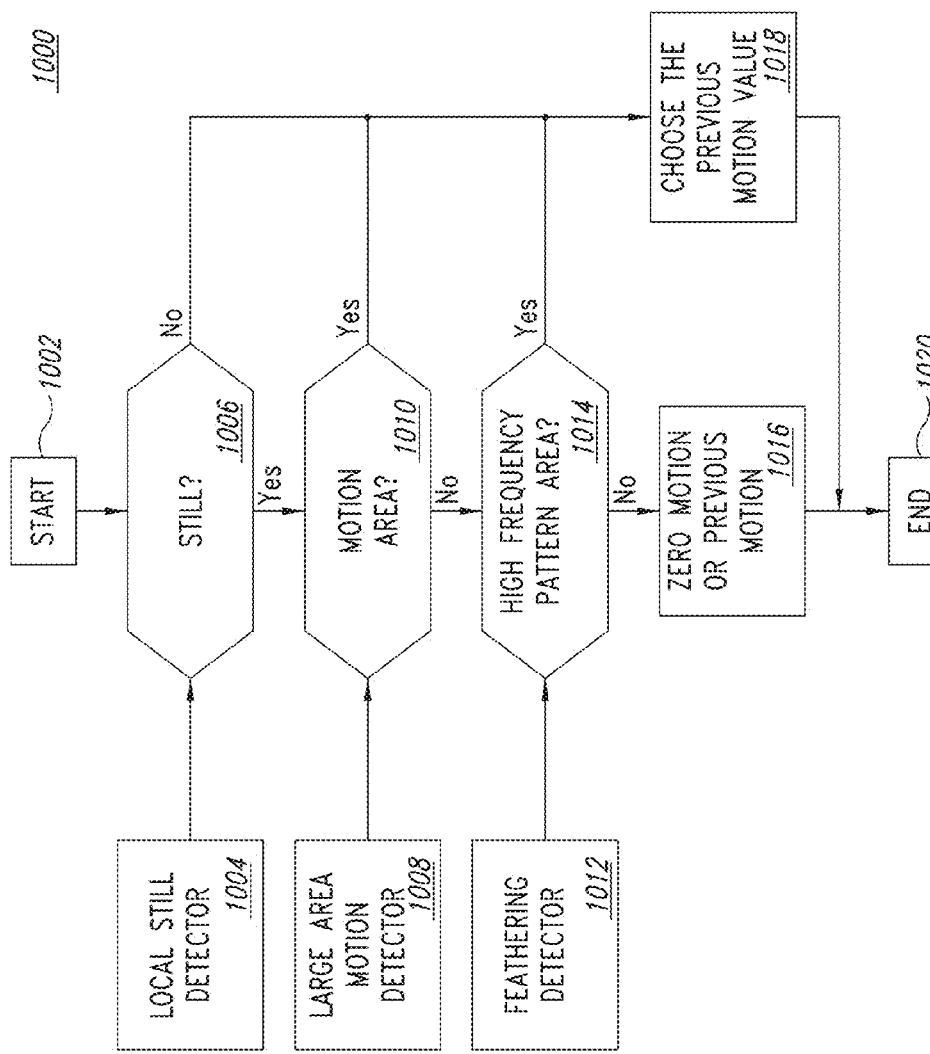
FIG. 10 is a processing algorithm of a recursive motion decision implementation.

FIG. 10 is a processing algorithm 1000 of a recursive motion decision implementation, such as carried out in the motion decision module 216 of FIG. 3. The motion decision module 216 of FIG. 3 receives input from a local still detector module 230, an LAMD module 234, and a feathering detector 238. Processing in the motion decision module 216 begins at 1002.

At 1004, 1006 still (i.e., no detected motion) information 232 from the local still detector module 230 is analyzed. If the area of interest is in motion, processing falls through to block 1018. If the area of interest is still, processing advances to 1008, 1010 where motion information 236 from the LAMD module 234 is analyzed. If the large area motion detector 230 has detected motion, processing falls through to block 1018. Alternatively, if the large area motion detector 230 has not detected motion, processing advances to 1012, 1014. At 1012, 1014, feathering information 240 from the feathering detector module 238 is analyzed. If a proper high-frequency pattern area is detected, then processing falls through to block 1018. Alternatively, if the feathering information 240 indicates that the area of interest includes improper feathering, then processing falls through to block 1016.

In one implementation at 1016, a zero-motion signal is applied to the area of interest. The zero-motion signal has the effect of cropping generated motion detection pixel information from a displayed image. In another implementation at 1016, a previous motion value or some other reduced motion value is applied to the area of interest. The application of such motion value is to reduce or eliminate the effects of improper feathering artifacts in de-interlaced fast moving content that appears in repetitive patterns, and tail motion "halo" artifacts around moving objects on high frequency backgrounds.

The processing at 1018 commences in FIG. 10 when a local still detector detects motion, when an LAMD detector detects a motion area, or when a feathering detector does not detect an improper feathering artifact. In each of these cases, motion detection is performed without input or processing of the recursive motion processor 200.

Processing in the motion decision module 216 (FIG. 3) ends at 1020.

With respect to FIG. 10 and the processing of a motion decision module, other implementations are possible. For example, in an alternative implementation, each of the still motion detection (1004, 1006), the large area motion detection (1008, 1010), and the feathering detection (1012, 1014) are determined independently. After independent determination, if any identification of likely improper artifacts is found, then processing of the type identified in block 1016 and specific to the identified likely improper artifact is performed.

Figure 11:
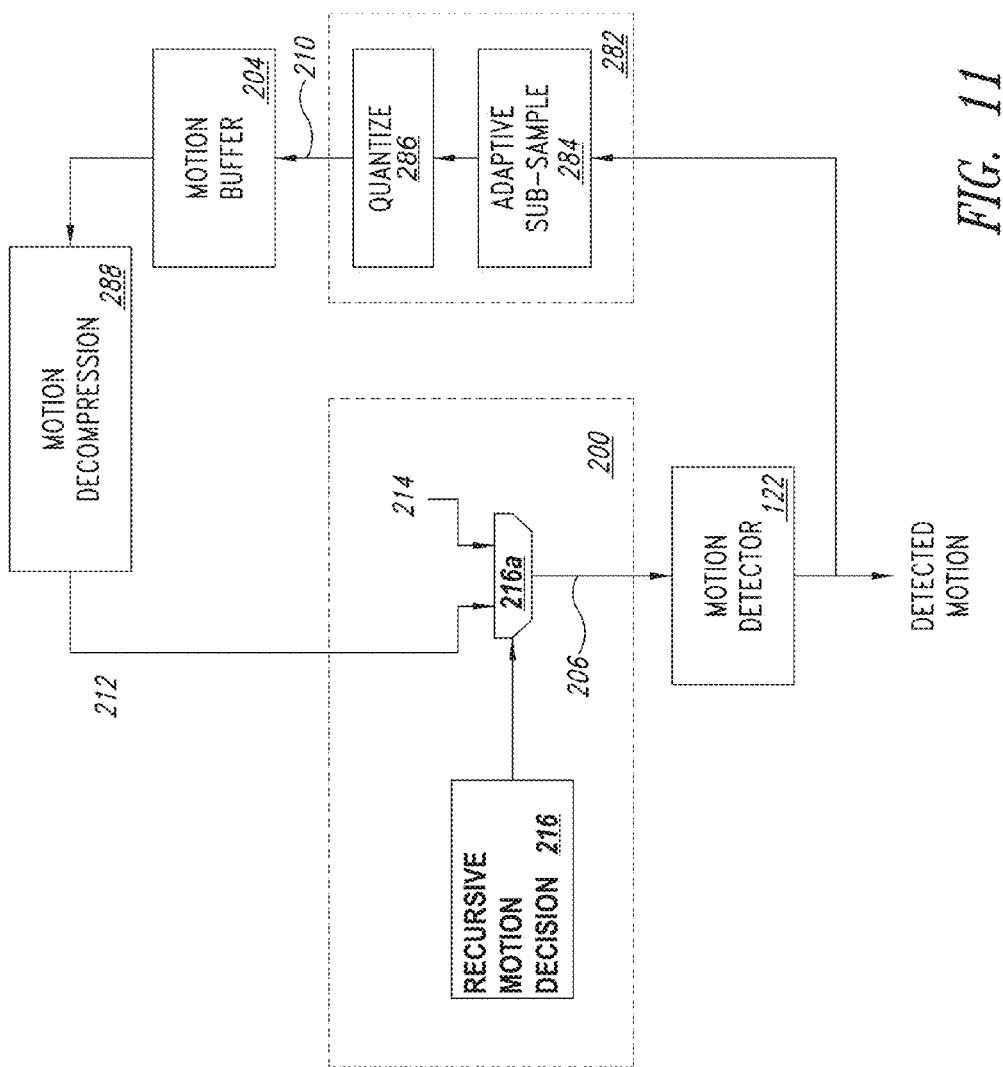
FIG. 11 is another recursive motion processing circuit implementation.

FIG. 11 is another recursive motion processing circuit implementation. In the implementation of FIG. 11, a portion of recursive motion processor 200 is illustrated. The portion of the recursive motion processor 200 shown in FIG. 11 includes the recursive motion decision module 216 and motion decision logic circuit 216a illustrated in FIG. 3. Motion detector module 122, which receives processed motion information 206 from the motion decision logic circuit 216a, is also illustrated in FIG. 11. Finally, the motion values storage repository 204 of FIG. 3 is also shown.

In addition to logic previously described, the implementation of FIG. 11 further includes a motion data compression module 282 and a motion data decompression module 288. The motion data compression module 282 includes on adaptive subsample module 284 and a quantization circuit 286. Motion data produced by one or both of the motion detector module 122 and the recursive motion processor 200 is compressed prior to storage in the motion values storage repository 204. Prior to its re-use by the recursive motion processor 200, the stored motion data is decompressed with the motion decompression module 288. Recursive motion pre-processing based on adaptive sub-sampling according to motion values has been shown to minimize processing cost and artifacts that would otherwise be displayed in a conventional device. The adaptive sub-sampling step helps to avoid artifacts while compressing the motion values from many bits per pixel to fewer bits per pixel. In one implementation, a system that would otherwise store eight bits per pixel was compressed to instead store only one bit per pixel. In this case, the processing cost was reduced because the amount of motion history that needs to be stored and retrieved can be done more quickly in a smaller memory area.

Figure 12:
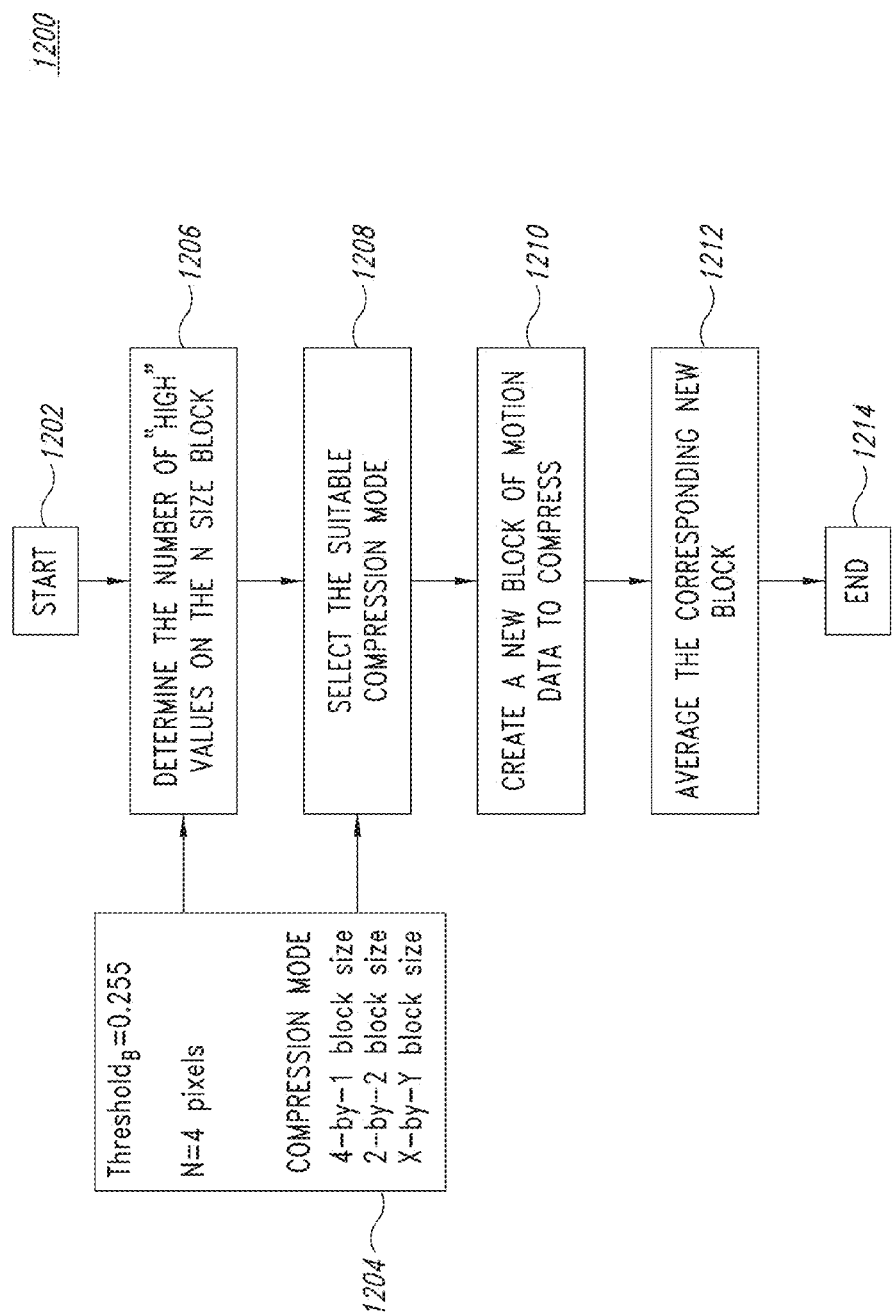
FIG. 12 is a processing algorithm of an adaptive subsampling implementation.

FIG. 12 is a processing algorithm 1200 of an adaptive subsampling implementation that may be performed by the adaptive subsample module 284. The adaptive subsample algorithm performs initial acts to compress motion data used by the recursive motion processor 200.

Figure 13:
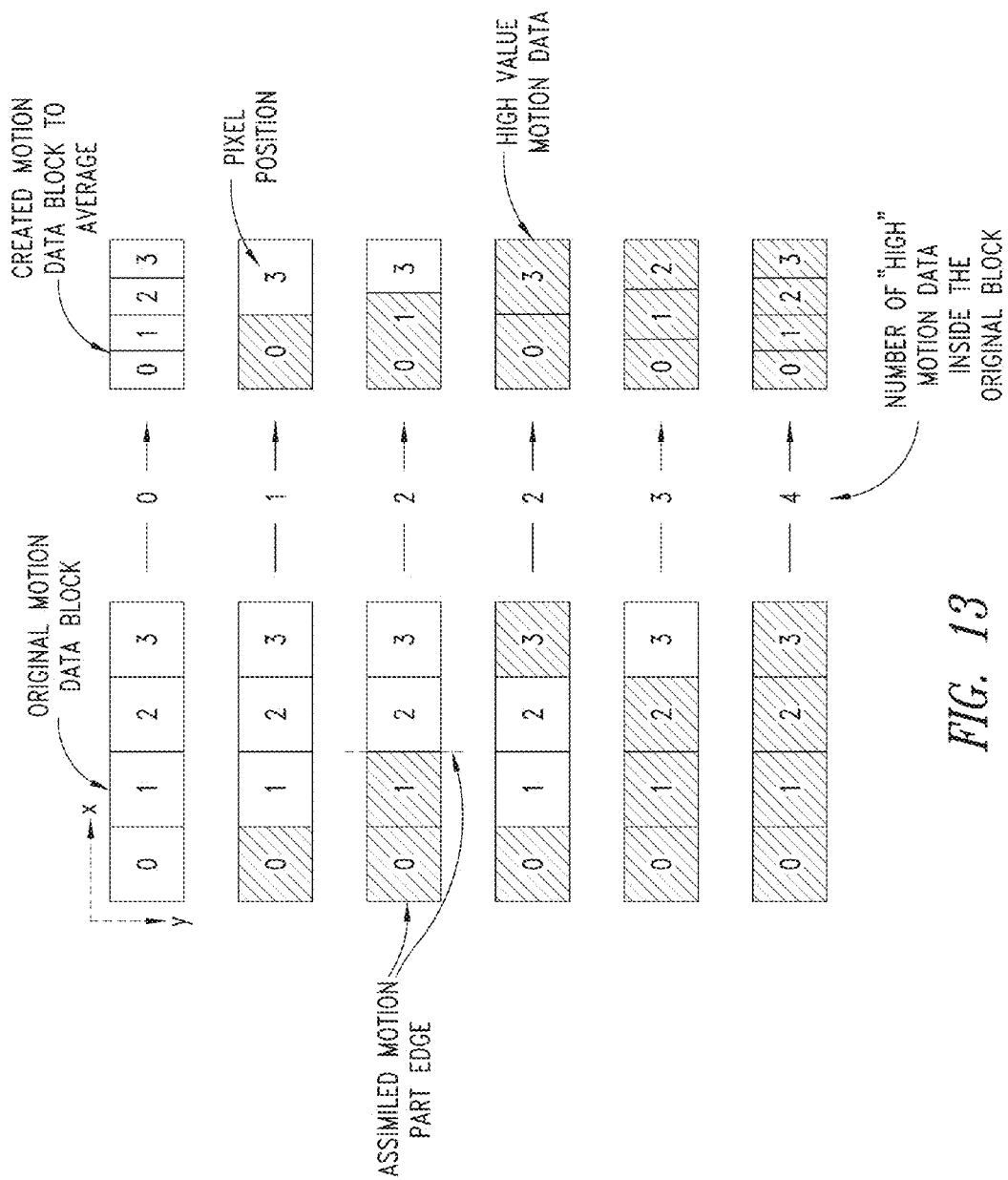
FIG. 13 shows an exemplary subsampling operation.
Figure 14:
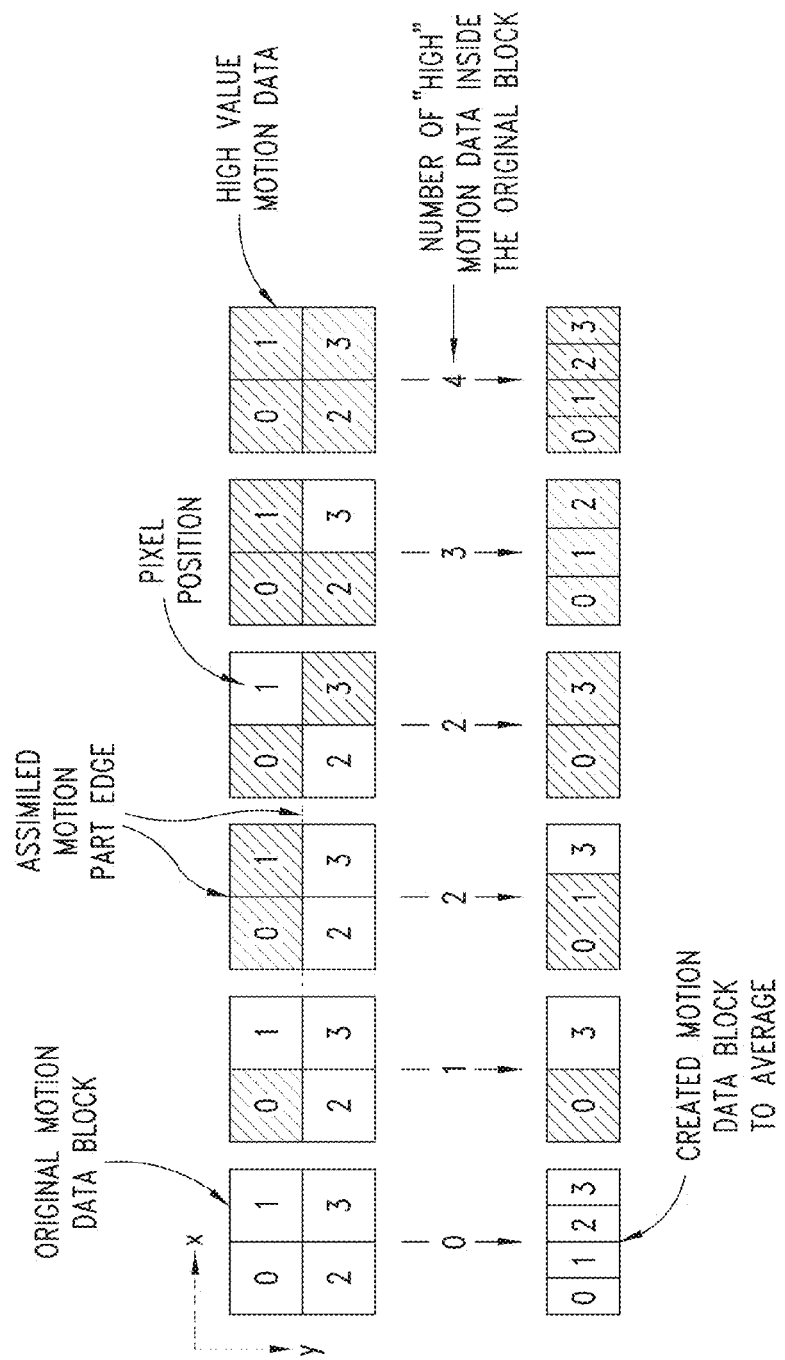
FIG. 14 shows another exemplary subsampling operation.

FIGS. 13 and 14 show exemplary subsampling operations. Processing algorithm 1200 of FIG. 12 implements the subsampling operations illustrated in FIGS. 13 and 14.

FIG. 13 illustrates how the processing algorithm 1200 may perform to compress six different blocks of video data formed of 4×1 pixels. Each pixel is numbered for clarity in the illustration. In the left-hand column original motion data blocks are analyzed. The right-hand column shows how each of the six different blocks of pixels is modified into a motion data block that will be averaged.

Considering the first row of the left-hand column in FIG. 13, none of the four original pixels of motion detection video data are determined to have much, if any, motion. In this sense, the number of "HIGH" motion data pixels inside the original 4×1 block is zero. Thus, the motion data block that is created will illustrate all four of the original pixels.

Considering the second row of original motion data blocks in the left-hand column of FIG. 13, pixel 0 is determined to have high motion. Accordingly one pixel is determined to have high motion, and the created data block to be averaged includes high motion pixel 0 and the rightmost low motion or no motion pixel 3.

In the third row in FIG. 13, two of the four pixels are determined to have high motion, pixel 0 and pixel 1. When the block is analyzed, a new motion data block to average is created bearing only the two high-value pixels. In this case, the created motion data block also includes pixel 3, which is not a high motion pixel. In some implementations, pixel 3 is included because it is recognized as an edge transition between high motion and low or no motion. In other implementations, pixel 3 may be included in recognition that less than half of the pixels in the block have high motion.

In the fourth row, similar to the third row, two pixels have high motion. The two high motion pixels, pixel 0 and pixel 3, sandwich pixel 1 and pixel 2, which do not have high motion. In row four the two pixels that do not have high motion, pixel 1 and pixel 2, are dropped from the created motion data block that will be averaged.

In the fifth row of original motion data blocks of FIG. 13, three consecutive pixels are recognized as having high motion. Since more than half of the pixels in the block have high motion, the created motion data block to average includes only the three high motion pixels, pixels 0, 1, and 2. The created motion data block to average in row five is different from rows two and three because more than half of the data blocks are high motion data. Finally, in row six, all four of the pixels in the row have high motion, and so all four pixels are formed in the created motion data block to average.

FIG. 14 may be understood in light of the discussion of FIG. 13. In FIG. 14, the exemplary video data blocks processed in algorithm 1200 are each formed as 2×2 pixels. For simplicity, the original 2×2 motion data blocks are shown in six columns, which is different from FIG. 13 where the original 4×1 motion data blocks are shown in six rows. Despite the different orientation, other similarities are present. For example, the patterns of data with respect to pixels 0 to 3 are the same in FIG. 14 as they are in FIG. 13. This is shown for simplicity. It is recognized that original motion data blocks may take on nearly any different number of pixels and nearly any configuration, such as 8×1, 4×2, 4×4, and the like.

Recognizing the similarities in FIG. 14 to FIG. 13, it is evident that the motion data blocks that were created in FIG. 14 are the same as in FIG. 13. Thus it is shown that processing algorithm 1200 in its compression mode is flexible and may dynamically process many different blocks of pixel configurations Processing in algorithm 1200 of FIG. 12 begins at 1202. At 1204 and 1206, the number of "HIGH" motion pixels in an N-size block is determined. A high motion pixel is one determined to meet a particular threshold. In some implementations, the amount of motion of a particular pixel is identified as taking on a value between 0 and 255, but other ranges are contemplated. If the pixel is determined to be above a threshold of 127, for example, the pixel is identified as having high motion. Considering the implementations of FIGS. 13 and 14, the processing at 1206 will determine how many of the four pixels in the block have high motion. In correspondence with

1204, 1206, processing at 1208 will select a suitable compression mode. FIG. 13 represents an exemplary compression mode of 4×1 block size; FIG. 14 represents an exemplary compression mode of 2×2 block size; other compression modes are recognized.

At 1210, a new block of motion data to compress is created, and that 1212 the new block is averaged. Processing ends at 1214.

Figure 15:
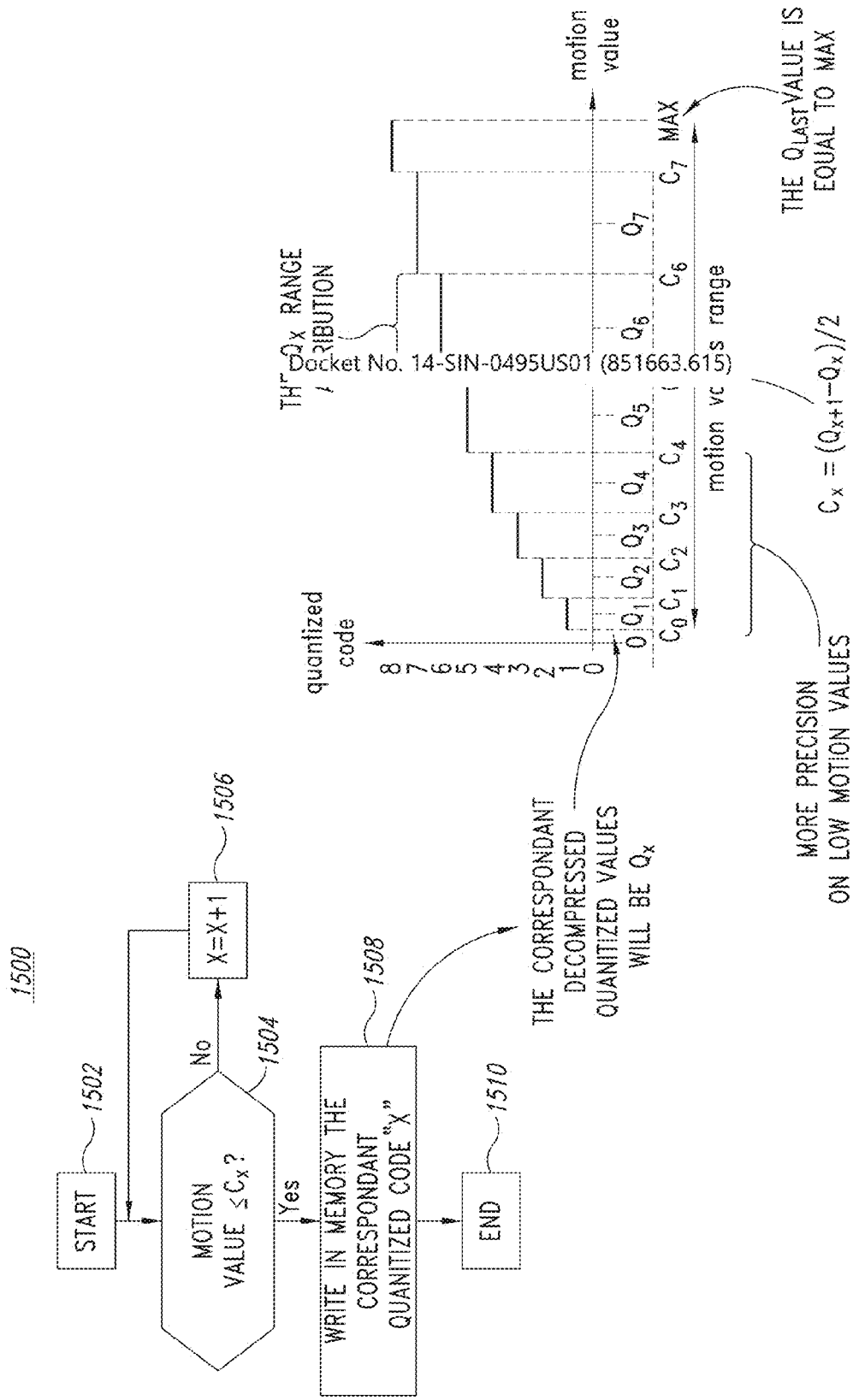
FIG. 15 shows an exemplary quantization operation.

FIG. 15 shows an exemplary quantization operation 1500, which may be carried out by the quantization module 286 of FIG. 11. Processing of the operation begins at 1502, and at 1504, the motion values passed by the adaptive sub-sampling module 284 are evaluated. Various mechanisms of valuation within the motion data compression module 282 are possible. One such mechanism is illustrated in the graph of FIG. 15, which may be carried out in any way. In the graph, a quantized code axis is coordinated with a motion value axis. Depending on the motion value, a particular quantization code will be selected. As evident in the graph, motion values range from a lowest representative value indicated by $C_0$ to a highest representative value indicated by MAX. The motion values may follow a linear scale, a logarithmic scale, or some other scale. As evident in the graph, more precision is granted on lower motion values. Discrete quantization values are defined for a range of motion values. In the graph, the relationship between motion values and quantization codes is represented by formula 1.

$$C_X = (Q_{X+1} - Q_X)/2 \quad (1)$$

In the processing at 1504 and 1506, each motion value is evaluated until the equation is true. That is, when a large enough motion quantization value is reached, processing falls through to 1508; before a large enough motion quantization value is reached, each sequential value is tried. Other mechanisms are contemplated.

When the quantization value is determined, the correspondent quantization code is written to a memory such as the motion values storage repository 204. It is recognized that when motion values are retrieved from the memory, a decompression process re-creates the motion values that are used in the recursive motion processing module 200. During decompression, in motion decompression module 288 for example, the motion values are not exactly representative of the original values; instead, the decompressed motion values are approximations determined by the quantization values. Processing of the exemplary quantization module 286 ends at 1510.

The inventors have experimented with video processing technology and constructed implementations of the recursive motion processing module 200 as described in the present disclosure. In the course of conception, creation, development, experimentation, and testing of various forms, particular results have been observed. A set of before and after illustrations are presented in all FIGS. 16-18.

Figure 16A:
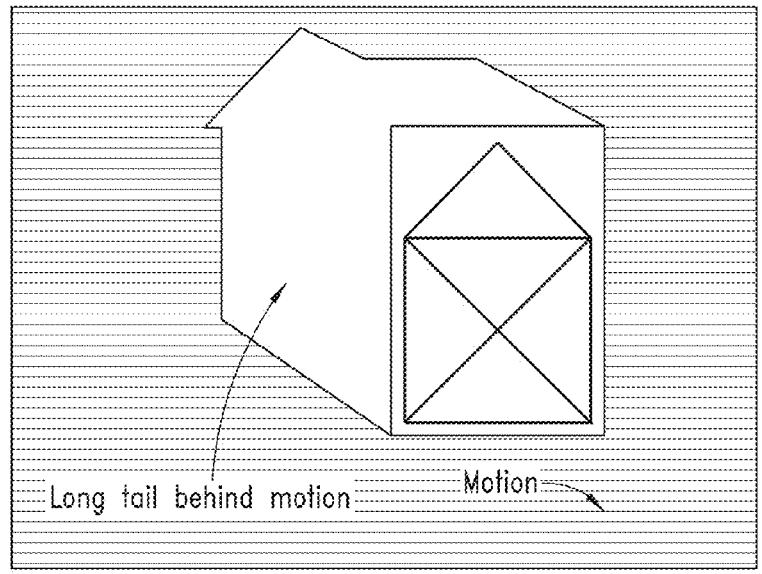
FIG. 16A shows a conventional de-interlaced image in motion having a long tail halo artifact behind the object.
Figure 16B:
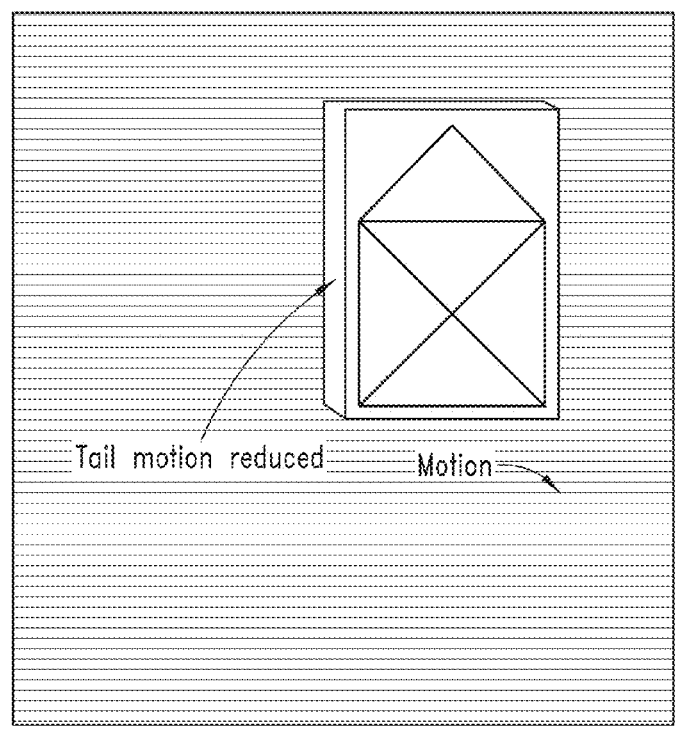
FIG. 16B shows an inventive de-interlaced image in motion having the long tail behind the object reduced.

FIG. 16A shows a conventional de-interlaced image in motion having a long tail halo artifact behind the object. FIG. 16B shows an inventive de-interlaced image in motion having the long tail behind the object reduced. In the conventional image of FIG. 16A, the long tail motion behind the object is very noticeable behind a high-frequency chroma background such as magenta-green. In an implementation of the present recursive motion processing module 200, the high-frequency tail or halo artifact is detected and cropped, thereby improving the display performance and viewing experience of a user.

FIG. 17A shows feathering artifacts in a conventional de-interlaced image in motion. In the figure, a camera is panning from left to right. As the camera pans certain feathering artifacts are clearly visible as portions of the vertical fence members are improperly reproduced. FIG. 17B shows the feathering artifacts in the conventional de-interlaced image in more detail. The video sequence from which the still images of FIGS. 17A and 17B are taken was processed with an implementation of the present recursive motion processing module 200, and a noticeably improved performance and reduction of feathering artifacts was realized. FIG. 17C shows a reduction in feathering artifacts in an inventive de-interlaced image in motion.

Figure 18A:
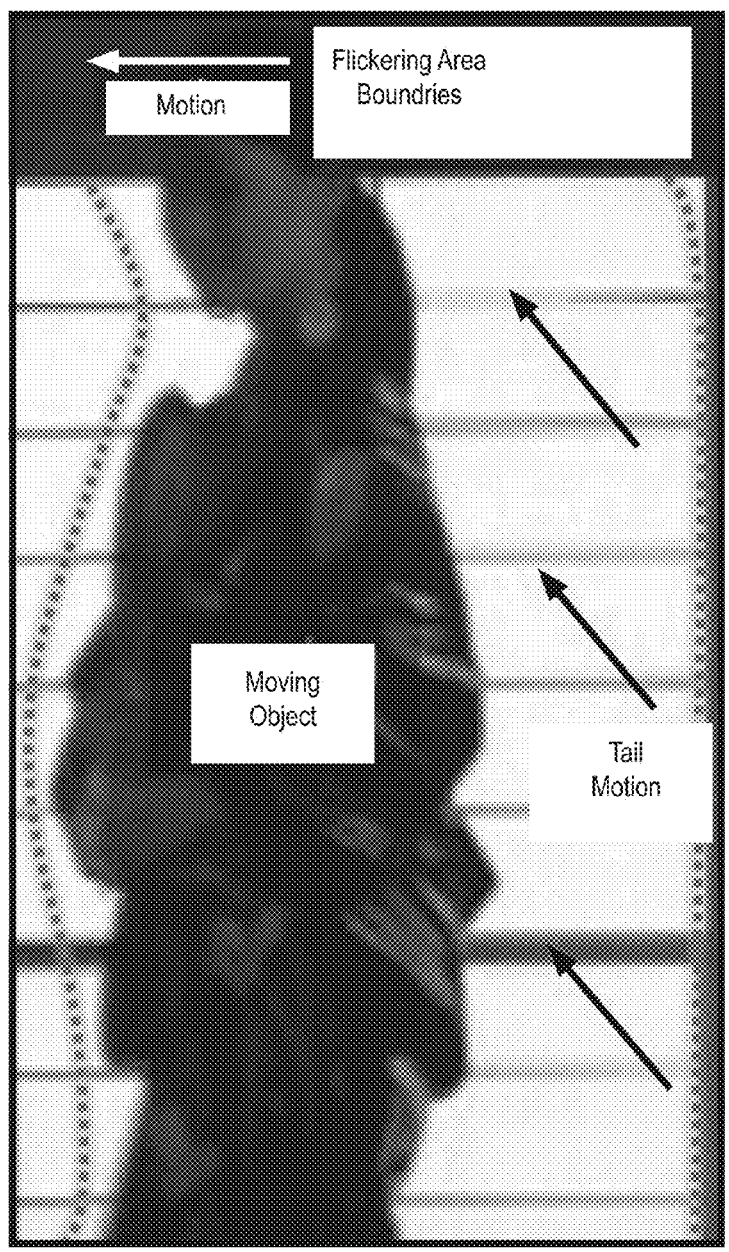
FIG. 18A shows a large flickering area boundary in a conventional de-interlaced image of an object in motion.
Figure 18B:
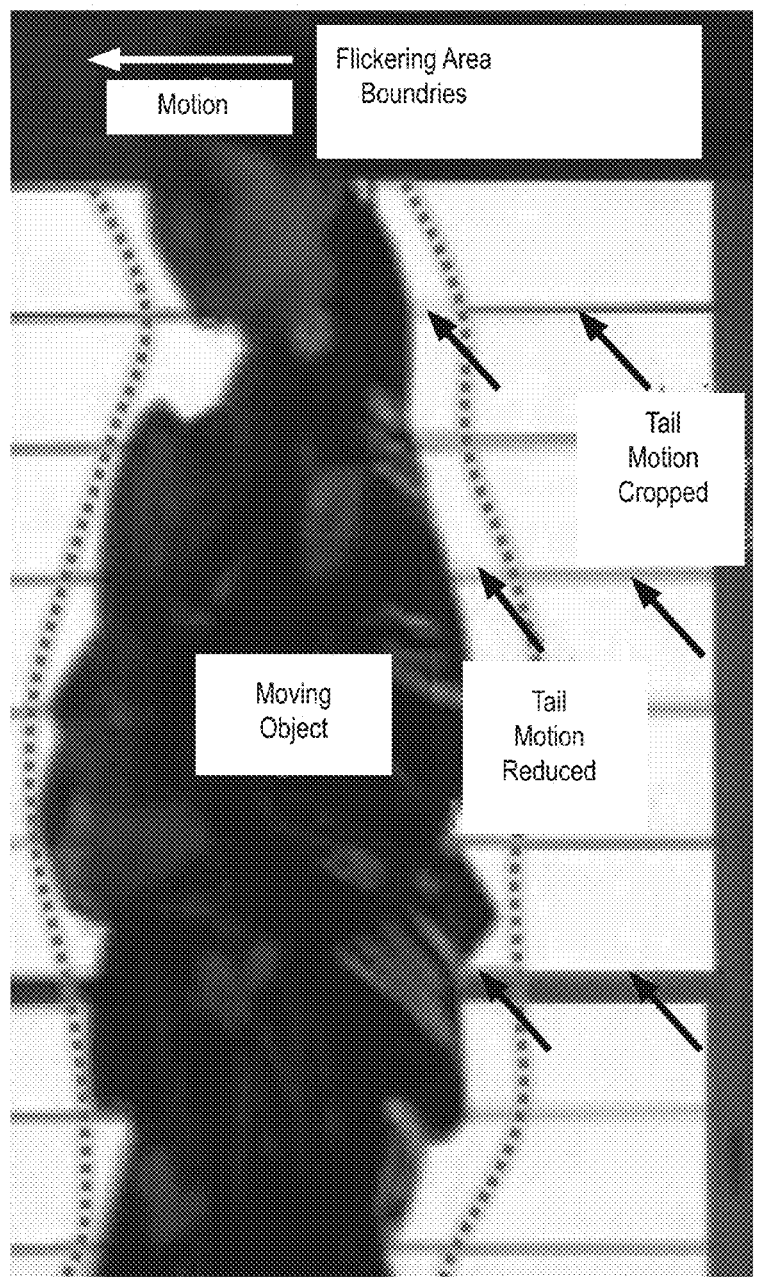
FIG. 18B shows an improved flickering area in an inventive de-interlaced image in motion.

FIG. 18A shows a large flickering area boundary in a conventional de-interlaced image of an object in motion. In FIG. 18A, a woman is walking past a window. The window has a number of horizontal members. In FIG. 18A, the horizontal members of the window are very blurry and flickering for a long distance behind the edge of the woman's body. The video sequence of the woman walking was processed with an implementation of the present recursive motion processing module 200. In the processing, long tails in the flickering area boundary were detected, and the generated effects based on motion detection, which are otherwise added after the edge of the moving object (i.e., the woman), are cropped to improve the rendered display and viewing experience for a user. FIG. 18B shows an improved flickering area in an inventive de-interlaced image in motion.

Implementations of the present invention provide noticeable and significant improvement over a conventional display processing structures and methods. The implementations described herein include methods of de-interlacing video using a recursive motion processor, which is a particular device configured to detect a still motion condition. Based on the detected still motion condition, the recursive motion processor generates decision values for combining with conventional detected motion values. In particular, implementations of the recursive motion processor are arranged to detect motion within a large area surrounding a current pixel. The recursive motion processor also detects local still motion of the current pixel and feathering patterns around the current pixel. Decision values are generated based on the detected large area motion, local still motion, and feathering pattern.

In order to detect motion within a large area surrounding a pixel, the recursive motion processor detects motion within a block of pixels and analyzes detected motion of blocks surrounding the current block. The block motion is then adjusted according to the analysis.

In order to detect a feathering pattern, the recursive motion processor calculates inter-field and intra-field differences in an area of interest, determines a threshold according to detected large area motion, and compares calculated differences against the determined threshold.

As described herein, the recursive motion processor is arranged to quantize combined motion values and reduce the amount of motion data that is stored. The recursive motion processor is also configured to adaptively subsample the quantized motion values within a block according to patterns of high motion values.

The implementations of recursive motion processing technology have been shown to provide very fast stabilization of de-interlaced video after motion or scene change. The implementations have also shown the removal or reduction of feathering artifacts generated by large or long repetitive video patterns. The implementations have also shown improved performance due to an effective sub-sampling scheme for the recursive motion values. The scheme has been shown to reduce buffer memory read/write bandwidth. Another benefit of the recursive motion processor implementations is realized with the application of specific control parameters such as the noise kill levels, thresholds, and block sizes discussed in the present disclosure. These control parameters permit the system to be dynamically configured.

Certain words and phrases used in the present disclosure are set forth as follows. The terms "include" and "comprise," as well as derivatives thereof, mean inclusion without limitation. The term "or," is inclusive, meaning and/or. The phrases "associated with" and "associated therewith," as well as derivatives and synonyms thereof, may mean to include, be included within, interconnect with, contain, be contained within, connect to or with, couple to or with, be communicable with, cooperate with, interleave, juxtapose, be proximate to, be bound to or with, have, have a property of, or the like. The terms "processor" and "controller" mean any device, system, or part thereof that controls at least one operation, and such devices may be implemented in hardware, firmware, or software, or some combination of at least two of the same. The functionality associated with any particular processor or controller may be centralized or distributed, whether locally or remotely. Other definitions of certain words and phrases are provided throughout this disclosure. Those of ordinary skill in the art will understand that in many, if not most instances, such definitions apply to prior as well as future uses of such defined words and phrases.

As used in the present disclosure, the term "module" refers to an application specific integrated circuit (ASIC), an electronic circuit, a processor and a memory operative to execute one or more software or firmware programs, combinational logic circuitry, or other suitable components (hardware, software, or hardware and software) that provide the functionality described with respect to the module.

In the foregoing description, certain specific details are set forth to provide a thorough understanding of various disclosed implementations. However, one skilled in the relevant art will recognize that implementations may be practiced without one or more of these specific details, or with other methods, components, materials, etc. In other instances, well-known structures associated with electronic and computing systems including client and server computing systems, as well as networks, have not been shown or described in detail to avoid unnecessarily obscuring descriptions of the implementations.

Unless the context requires otherwise, throughout the specification and claims which follow, the word "comprise" and variations thereof, such as "comprises" and "comprising," are to be construed in an open, inclusive sense, e.g., "including, but not limited to."

Reference throughout this specification to "one implementation" or "an implementation" and variations thereof means that a particular feature, structure, or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

The headings and Abstract of the Disclosure provided herein are for convenience only and do not interpret the scope or meaning of the implementations.

The various implementations described above can be combined to provide further implementations. Aspects of the implementations can be modified, if necessary to employ concepts of the various patents, application and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A video de-interlacing device to reduce motion-caused artifacts, comprising:
   a video data input interface to receive input video data, the input video data being a stream of interlaced video data, the input video data arranged in the video data input interface to include current video data, first delayed video data, and second delayed video data;
   a motion detector coupled to the video data input interface to produce motion detection video data from the input video data;
   a video data output interface coupled to the motion detector to pass de-interlaced video data, the de-interlaced video data generated from the motion detection video data; and
   a recursive motion processor coupled to the motion detector and arranged to detect a still motion condition, the recursive motion processor including:
   a first interface to pass the input video data;
   a second interface to pass previous motion data from a memory and to pass current motion data to the memory; and
   a third interface to pass a detected motion signal from the motion detector and to pass a processed motion signal to the motion detector, wherein the processed motion signal is based on the detected still motion condition, and wherein the motion detector is arranged to crop the motion detection video data based on the processed motion signal.

2. The video de-interlacing device of claim 1, comprising:
   a motion compression module to compress the motion detection video data from the motion detector;
   a motion buffer memory to store compressed motion detection video data produced by the motion compression module; and
   a motion decompression module to produce decompressed motion detection video data from the compressed motion detection video data.

3. The video de-interlacing device of claim 2, wherein the motion compression module comprises:
   an adaptive sub-sampling circuit arranged to process the motion detection video data from the motion detector into new blocks of motion data based on a determined state of selected pixels in the motion detection video data;
   a quantizing circuit arranged to encode the new blocks of motion data based on a range of motion values.

4. The video de-interlacing device of claim 3, wherein processing the motion detection video data from the motion detector into new blocks of motion data by the adaptive sub-sampling circuit based on the determined state of selected pixels in the motion detection video data includes processing blocks of the motion detection video data in a single row of adjacent pixels.

5. The video de-interlacing device of claim 3, wherein processing the motion detection video data from the motion detector into new blocks of motion data by the adaptive sub-sampling circuit based on the determined state of selected pixels in the motion detection video data includes processing blocks of the motion detection video data in a block having pixels from at least two adjacent rows of pixels and pixels from at least two adjacent columns of pixels.

6. The video de-interlacing device of claim 1, comprising:
an intra-field spatial interpolation circuit coupled to the video data input interface to generate between-line pixels from video data sharing a common time parameter with pixels in an adjacent line;
an inter-field temporal interpolation circuit coupled to the video data input interface to generate between-line pixels from video data sharing a common spatial parameter with pixels in an adjacent line; and
a mixing circuit, the mixing circuit coupled to receive the motion detection video data from the motion detector, spatially interpolated video data from the intra-field spatial interpolation circuit, and temporally interpolated video data from the inter-field temporal interpolation circuit, the mixing circuit arranged to generate the de-interlaced video data.

7. The video de-interlacing device of claim 6, comprising:
a method decision circuit coupled to the motion detector, the intra-field spatial interpolation circuit, and the inter-field temporal interpolation circuit, the method decision circuit arranged to direct the mixing circuit to generate the de-interlaced video data based on motion detection information and a selection or combination of spatial interpolation information and temporal interpolation information.

8. The video de-interlacing device of claim 1, wherein the recursive motion processor includes:
a local still detector coupled to the video data input interface;
a large area motion detector coupled to the video data input interface;
a feathering detector coupled to the video data input interface; and
a motion decision circuit coupled to the local still detector, the large area motion detector, and the feathering detector, the motion decision circuit arranged to produce the processed motion signal, the processed motion signal selected from the previous motion data and zero motion data.

9. The video de-interlacing device of claim 1, wherein the recursive motion processor includes:
a local still detector arranged to produce a still-flag based on a difference between at least some of the current video data and at least some of the first delayed video data or second delayed video data, the still-flag arranged to indicate whether a portion of video associated with the at least some of the current video data is in motion.

10. The video de-interlacing device of claim 1, wherein the recursive motion processor includes:
a large area motion detector arranged to produce information identifying whether or not motion is detected within an area of interest, the area of interest covering at least one defined block of pixels.

11. A method to de-interlace an interlaced video stream, comprising:
receiving interlaced video data;
detecting motion in the interlaced video data;
producing motion detection video data based on the motion detected in the interlaced video data;
detecting a still motion condition in at least one area of the motion detection video data; and
producing de-interlaced video data based on the motion detection video data, the de-interlaced video data including a portion of video data that is cropped based on the detected still motion condition.

12. The method to de-interlace an interlaced video stream of claim 11, wherein the portion of video data that is cropped is based on how much still motion is detected in the at least one area of motion detection video data.

13. The method to de-interlace an interlaced video stream of claim 11, wherein detecting the still motion condition comprises:
performing local still detection;
performing large area motion detection; and
performing feathering detection.

14. The method to de-interlace an interlaced video stream of claim 13, wherein performing large area motion detection includes detecting motion in at least one defined block of pixels.

15. A device, comprising:
an input circuit to receive and buffer interlaced video data;
a circuit to perform motion detection on the interlaced video data, the circuit arranged to produce motion detection video data; and
a recursive motion processor to detect a still motion condition in at least one area in the motion detection video data, the recursive motion processor to also generate information to crop a portion of the motion detection video data associated with the detected still motion condition.

16. The device of claim 15, wherein the device is an integrated circuit.

17. The device of claim 16, wherein the integrated circuit includes a system on chip (SoC).

18. The device of claim 15, wherein the recursive motion processor comprises:
a local still detector;
a large area motion detector; and
a feathering detector.

19. The device of claim 18, wherein the local still detector comprises:
an absolute difference module; and
a comparator module.

20. The device of claim 18, wherein the feathering detector comprises:
an inter-field difference module;
a math circuit; and
a comparator module.

* * * * *